(12) United States Patent
Subbiah et al.

(10) Patent No.: US 9,385,915 B2
(45) Date of Patent: Jul. 5, 2016

(54) DYNAMIC CACHING TECHNIQUE FOR ADAPTIVELY CONTROLLING DATA BLOCK COPIES IN A DISTRIBUTED DATA PROCESSING SYSTEM

(71) Applicant: NetApp, Inc., Sunnyvale, CA (US)

(72) Inventors: Sethuraman Subbiah, Santa Clara, CA (US); Gokul Soundararajan, Sunnyvale, CA (US); Tanya Shastri, Sunnyvale, CA (US); Lakshmi Narayanan Bairavasundaram, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 529 days.

(21) Appl. No.: 13/690,158

(22) Filed: Nov. 30, 2012

(65) Prior Publication Data

US 2014/0156777 A1 Jun. 5, 2014

(51) Int. Cl.
 *G06F 15/167* (2006.01)
 *H04L 29/08* (2006.01)
 *H04L 29/06* (2006.01)

(52) U.S. Cl.
 CPC ...... *H04L 29/08144* (2013.01); *H04L 67/1002* (2013.01); *H04L 67/1097* (2013.01); *H04L 67/2814* (2013.01); *H04L 67/2842* (2013.01); *H04L 67/2852* (2013.01); *H04L 69/02* (2013.01)

(58) Field of Classification Search
 USPC .......................................................... 709/213
 See application file for complete search history.

(56) References Cited

U.S. PATENT DOCUMENTS

| | | | | |
|---|---|---|---|---|
| 6,438,652 B1 * | 8/2002 | Jordan et al. | ................ | 711/120 |
| 7,039,784 B1 * | 5/2006 | Chen et al. | ................ | 711/170 |
| 7,403,993 B2 * | 7/2008 | John et al. | ................ | 709/226 |
| 8,255,457 B2 * | 8/2012 | Turner et al. | ................ | 709/203 |
| 8,744,997 B2 * | 6/2014 | Zunger et al. | ................ | 707/610 |
| 2002/0055972 A1 * | 5/2002 | Weinman, Jr. | ............. | 709/203 |
| 2010/0228819 A1 * | 9/2010 | Wei | ................ | 709/203 |
| 2010/0293338 A1 * | 11/2010 | Krishnaprasad et al. | ..... | 711/136 |

(Continued)

FOREIGN PATENT DOCUMENTS

WO WO 2011/059638 A2 5/2011

OTHER PUBLICATIONS

Emulex White Paper—Boosting Hadoop Performance with Emulex OneConnect 10GbE Network Adapters, http://www.emulex-dell.com/artifacts/...9f0b.../elx_wp_all_oc_hadoop.pd.f pp. 1-15, 2012.

(Continued)

*Primary Examiner* — Shirley Zhang
(74) *Attorney, Agent, or Firm* — Haynes and Boone, LLP

(57) ABSTRACT

A dynamic caching technique adaptively controls copies of data blocks stored within caches ("cached copies") of a caching layer distributed among servers of a distributed data processing system. A cache coordinator of the distributed system implements the dynamic caching technique to increase the cached copies of the data blocks to improve processing performance of the servers. Alternatively, the technique may decrease the cached copies to reduce storage capacity of the servers. The technique may increase the cached copies when it detects local and/or remote cache bottleneck conditions at the servers, a data popularity condition at the servers, or a shared storage bottleneck condition at the storage system. Otherwise, the technique may decrease the cached copies at the servers.

17 Claims, 16 Drawing Sheets

(56) References Cited

U.S. PATENT DOCUMENTS

2010/0318584 A1* 12/2010 Krishnaprasad et al. ..... 707/813
2011/0161291 A1   6/2011 Taleck et al.
2012/0102181 A1*  4/2012 Crowder et al. ............. 709/223
2013/0132967 A1   5/2013 Soundararajan
2013/0246564 A1*  9/2013 Lee et al. .................... 709/217

OTHER PUBLICATIONS

PCT Notification of Transmittal of the International Search Report and the Written Opinion of the International Searching Authority, or the Declaration, International Searching Authority, International Application No. PCT/US2013/071868, mailed Apr. 4, 2014, 9 pages.
International Preliminary Report on Patentability for Application No. PCT/US2013/071868 mailed on Jun. 2, 2015, 6 pages.

* cited by examiner

DYNAMIC CACHING TECHNIQUE FOR ADAPTIVELY CONTROLLING DATA BLOCK COPIES IN A DISTRIBUTED DATA PROCESSING SYSTEM

BACKGROUND

1. Technical Field

The present disclosure relates to data processing systems and, more specifically, to caching of data in a distributed data processing system.

2. Background Information

In many current analytics frameworks, distributed data processing systems may be used to process and analyze large datasets, such as files. An example of such a framework is Hadoop, which provides data storage services using a distributed file system and data processing services though a cluster of commodity servers. The Hadoop based distributed system partitions the datasets into blocks of data for distribution and storage among local storage devices coupled to the servers to enable processing of the data by the servers in accordance with one or more data analytics processes. MapReduce is an example of a computational model or paradigm employed by Apache Hadoop to perform distributed data analytics processes on large datasets using the servers.

Broadly stated, a MapReduce process is organized into a Map step and a Reduce step. In the Map step, an analytics request or "job" is apportioned into a plurality of sub-jobs or "tasks" that are distributed to the servers. Each server performs its tasks independently on its stored data blocks and produces intermediate results. The servers then execute the Reduce step to combine all of the intermediate results into an overall result. Apache Hadoop is a specific example of a software framework designed for performing distributed data analytics on large datasets.

When deployed in an enterprise environment, however, such distributed systems typically suffer from problems including reliance on a single storage tier (i.e., the local storage device tier) for both performance and reliability, as well as lack of data management features. To address these problems, the system may be enhanced through the addition of a storage system and a caching layer distributed among the servers that increases the number of storage tiers, e.g., a shared storage tier and a distributed cache tier. Yet, the enhanced distributed system may be subjected to congestion conditions, such as local and remote cache bottlenecks at the servers, data popularity at the servers, and shared storage bottleneck at the storage system, that may adversely affect throughput and performance.

According to the distributed data analytics process, a block of data may reside on a local storage device of a server, as well as on the shared storage system. Different tasks pertaining to multiple jobs that require that block of data may be scheduled on the server. If all the tasks requests the data block, the local storage device may become a local bottleneck, which adversely impacts throughput of the device and server. Each server may also be assigned a limited number of "slots" or tasks that may be run in parallel. If the slots are occupied by existing tasks, new tasks may be scheduled in a different server, resulting in traffic forwarded from remote servers and creating a remote bottleneck at the different server.

In addition, a failure may occur to a server of the cluster, requiring that the server's block of data be accessed from the shared storage system, e.g., during reconstruction. If multiple servers of the cluster experience failures, there may be an increase in traffic to the shared storage system to access multiple blocks. The resulting increase in traffic may effectively reduce the size of the cluster supported by the shared storage system and create a shared storage bottleneck. Moreover, there may be one or more blocks residing on the local storage device of a server that are popular in the sense that multiple requests from other servers are directed to those blocks. The increased traffic at the server due to popularity of these data blocks may degrade performance of the server and its local storage device.

SUMMARY

Embodiments described herein provide a dynamic caching technique that adaptively controls a number of copies of data blocks stored within caches ("cached copies") of a caching layer distributed among servers of a distributed data processing system. A cache coordinator of the distributed system illustratively implements the dynamic caching technique to increase (i.e., replicate) the number of cached copies of the data blocks to thereby alleviate congestion in the system and improve processing performance of the servers. Alternatively, the technique may decrease (i.e., consolidate) the number of cached copies to reduce storage capacity and improve storage efficiency of the servers. In particular, the technique may increase the number of cached copies when it detects local and/or remote cache bottleneck conditions at the servers, a data popularity condition at the servers, or a shared storage bottleneck condition at the storage system. Otherwise, the technique may decrease the number of cached copies at the servers.

In one or more embodiments, the cache coordinator may cooperate with a statistics manager of the distributed system to maintain statistics pertaining to the data blocks stored on the servers of the distributed system in order to render decisions regarding adaptive cache replication/consolidation. The cache coordinator may then utilize the statistics to implement the dynamic caching technique to adaptively control the number of cached copies of a data block in the distributed system. To that end, the technique may include a replication phase and a consolidation phase. The replication phase is directed to identifying one or more servers, as well as one or more data blocks, that contribute to congestion in the system. Illustratively, the server (i.e., a source server) is designated as congested when the number of data block requests assigned to the server exceeds the total number of data block requests that can be processed, in parallel, by the server. In that case, the technique identifies and selects another server (i.e., a target server) that is not congested and that can accommodate replication of the data block, as well as data block requests directed to that data block from the congested server. The data block is then replicated (copied) to the target server and the data block requests are redirected to the copied data block. In contrast, the consolidation phase is directed to identifying copies of a data block that exceed a minimum number of replicas and then consolidating the copies of the data block in the system. Illustratively, consolidation is achieved by removing a copy of the data block from a source server and redirecting data block requests directed to the removed block at the source server to a target server that stores the data block and that can accommodate the redirected requests.

Advantageously, the dynamic caching technique adaptively controls the cached copies of data blocks stored within caches of the caching layer to optimize distributed analytics running on the shared storage infrastructure of the distributed system. That is, the dynamic caching technique may increase or decrease the number of cached copies of data blocks to allow users greater flexibility and address problems that customers may encounter in an enterprise environment, such as bottlenecks, failures, and system reconfigurations. The dynamic technique also allows users to balance between performance and storage efficiency.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
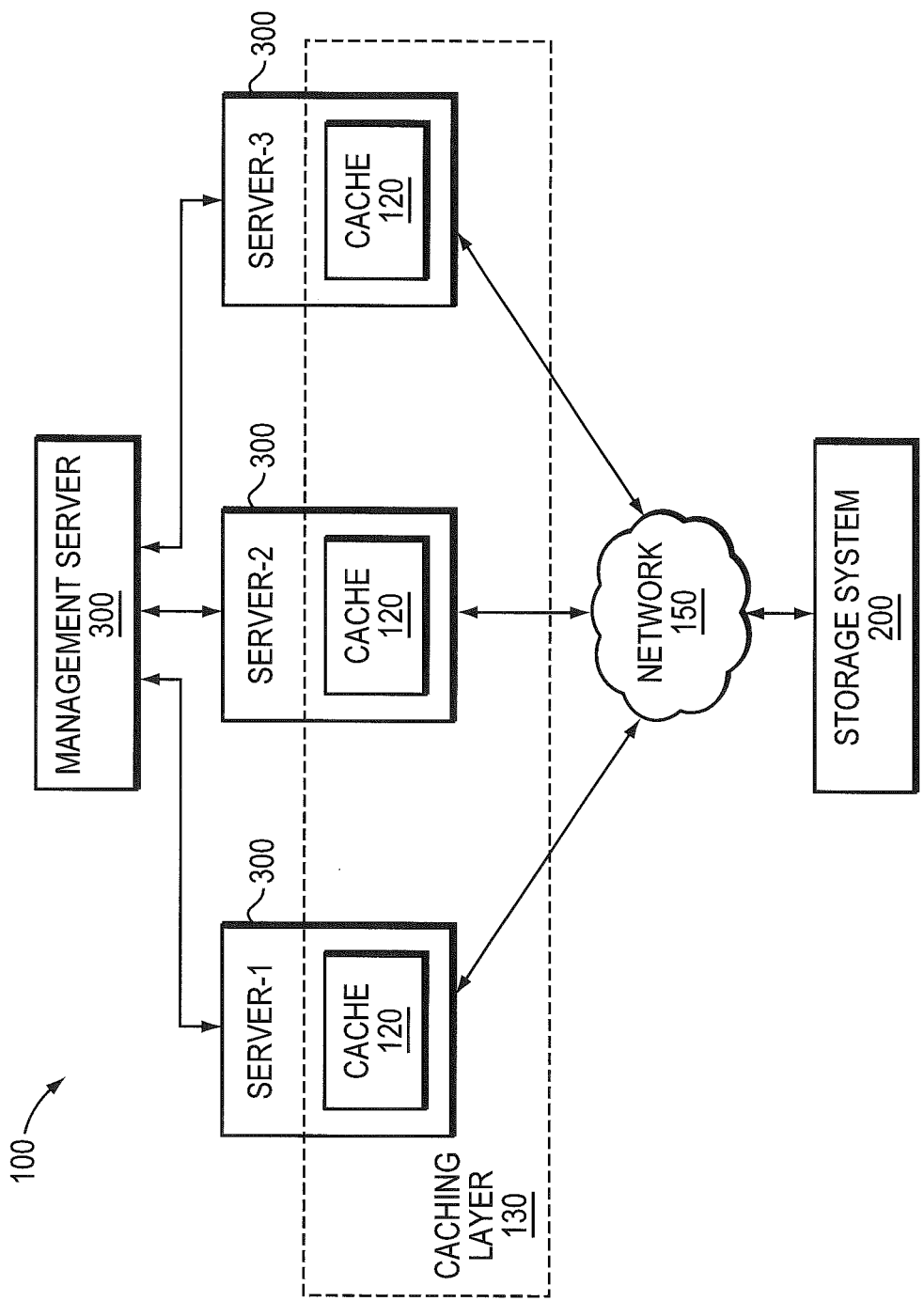
FIG. 1 is a block diagram of a distributed data processing system.

FIG. 1 is a block diagram of a distributed data processing system 100 that may be advantageously used with one or more embodiments described herein. The distributed system 100 may be organized as a plurality of servers 300, including a master server ("management server") and a cluster of slave servers ("servers 1-3"), connected to a storage system 200 by a network 150. The network 150 may include a point-to-point link, a shared local area network, a wide area network or a virtual private network implemented over a public network, such as the well-known Internet. The distributed system 100 may be used to process and analyze large datasets by partitioning the datasets into blocks of data for distribution and storage among local storage devices of the servers 1-3. The local storage devices may be embodied as caches 120 configured to provide a caching layer 130 of the distributed system 100. An example of a distributed system that is configured to provide a caching layer and that may be advantageously used with the embodiments herein is described in U.S. patent application Ser. No. 13/302,306, filed Nov. 22, 2011 and titled *Optimizing Distributed Data Analytics for Shared Storage*, by Gokul Soundararajan, et al., which application is hereby incorporated by reference as though fully set forth herein.

Figure 2:
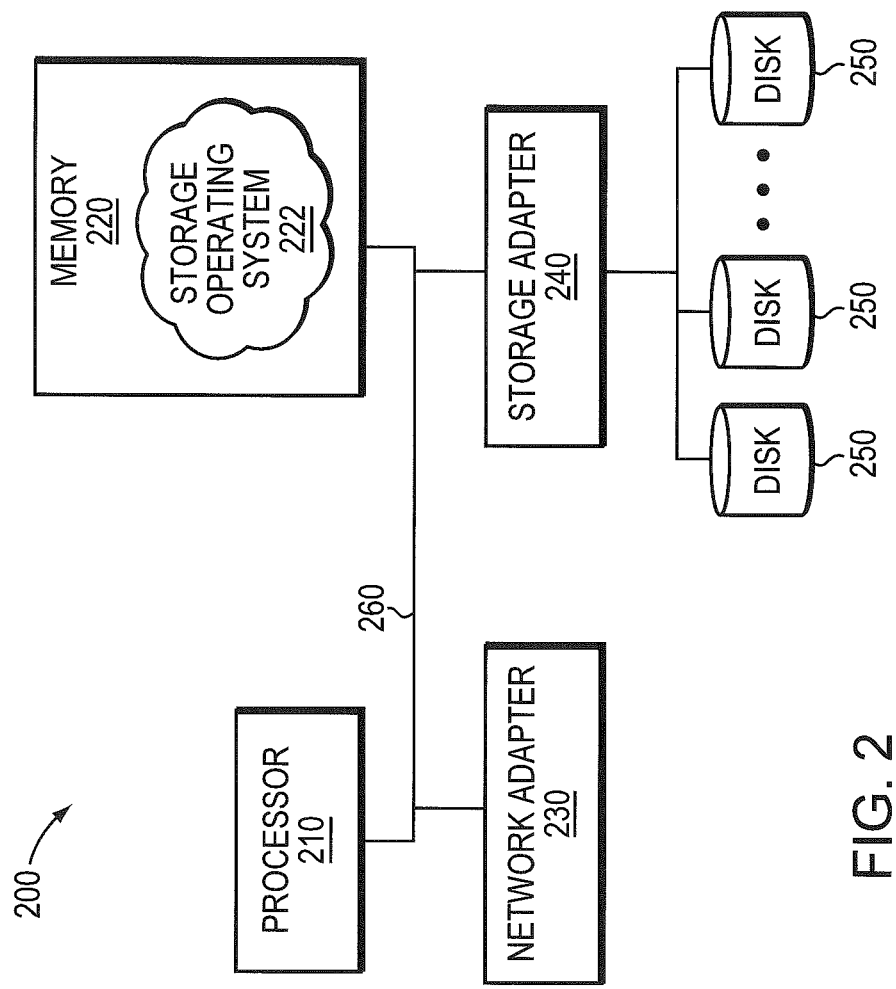
FIG. 2 is a block diagram of a storage system of the distributed data processing system.

FIG. 2 is a block diagram of storage system 200 that may be advantageously used with one or more embodiments described herein. The storage system 200 may be a computer coupled to a plurality of disks 250 and having features such as simplicity of storage service management and ease of storage reconfiguration, including reusable storage space, for users such as servers 300. In addition, the storage system 200 may be configured to interact with the servers 300 to enable service of data, e.g., stored on the disks 250 or other similar media adapted to store data, in file system and block formats with high reliability and integrity through the use of data protection and management techniques, such as persistent point-in-time read-only images of the data, and/or Redundant Array of Independent (or Inexpensive) Disks (RAID) implementations.

The storage system illustratively includes a processor 210, a memory 220, one or more network adapters 230 and a storage adapter 240 interconnected by a bus 260. Each network adapter 230 includes the mechanical, electrical and signaling circuitry needed to connect the storage system to the server 1-3 over network 150. The storage system 200 also includes a storage operating system 222 that provides a virtualization system to logically organize the data as a hierarchical structure of named directory, file and logical unit storage objects on disks 250. The virtualization system may be configured to provide volume management capabilities for use in block-based access to the data stored on disks 250. These capabilites include (i) aggregation of the disks, (ii) aggregation of storage bandwidth of the disks, and (iii) reliability guarantees, such as synchronous minoring and/or parity (RAID).

Storage of data on the storage system 200 may be implemented as one or more storage volumes that comprise a group of the disks 250, defining an overall logical arrangement of disk space. The disks within a volume are typically organized as one or more RAID groups. RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

In an embodiment, the storage system 200 may cooperate with the caches 120 of the servers 300 to provide a shared storage infrastructure of the distributed system 100. To that end, the storage adapter 240 may cooperate with the storage operating system 222 to access (e.g., retrieve via a read operation or store via a write operation) data requested by the servers. The storage adapter may include I/O interface circuitry that couples to the disks over an I/O interconnect arrangement, such as a conventional high-performance, FC serial link topology. The data may be retrieved or stored on disk 250 by the storage adapter and, upon completion, either the retrieved data or an acknowledgement (generated by the processor 222 or the adapter 240) may be forwarded over the bus 260 to the network adapter 230, where it is formatted into one or more packets and forwarded to the servers.

Figure 3:
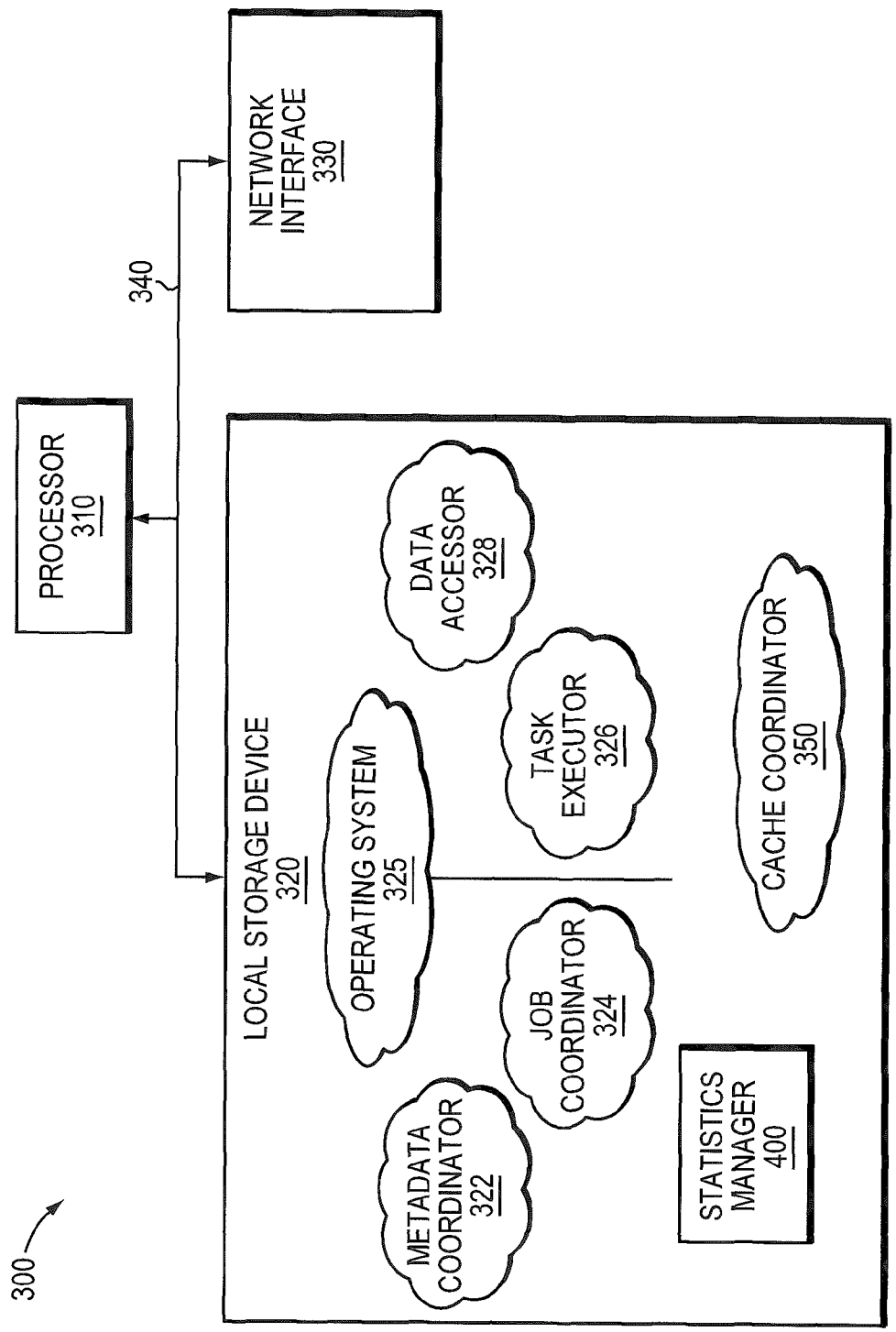
FIG. 3 is a block diagram of a server of the distributed data processing system.

FIG. 3 is block diagram of server 300 that may be advantageously used herein as, e.g., the management server or server 1-3. In one or more embodiments, the server 300 may be embodied as a physical machine, such as computer, or a virtual machine executing on the computer. However, as described herein, the server 300 is illustratively embodied as a computer including a processor 310 coupled to a local storage device 320 and one or more network interfaces 330 by a bus 340. The network interface 330 may contain the mechanical, electrical and signaling circuity for communicating data over physical and/or wireless links coupling the server to other servers and/or the network 150. The network interface 330 may be configured to transmit and/or receive data using a variety of communication protocols including, inter alia, the Transmission Control Protocol/Internet Protocol (TCP/IP), wireless protocols and/or Ethernet protocols.

As noted, the local storage devices may be embodied as caches 120 configured and organized to provide a caching layer 130 of the distributed system 100. To that end, the local storage device 320 may include random access memory (RAM), read only memory (ROM), flash memory, as well as one or more hard disk drives (HDD), flash drives, tape drives, solid state drives (SSD), and/or combinations of the memories and drives. The local storage device 320 includes a plurality of storage locations addressable by the processor 310 and/or network interface 330 for storing software programs (e.g., applications) and data structures associated with the embodiments described herein. The processor and interface may, in turn, include processing elements and/or logic circuitry configured to execute the software programs and manipulate the data structures, such as statistics manager 400.

An operating system 325, portions of which are typically resident in the local storage device 320 and executed by the processor 310, functionally organizes the server by, inter alia, invoking operations in support of software processes and/or services executing on the server. A suitable operating system 325 may include the UNIX® series of operating systems, the Microsoft Windows® series of operating systems or other similar operating system; however, in an embodiment described herein, the operating system is illustratively the Linux® operating system. The operating system 325 also illustratively implements a distributed file system that provides data storage services in support of an analytics framework of the system 100.

In the case of a server embodied as the management server, the software processes and/or services may include data analytic processes such as a metadata coordinator 322 and a job coordinator 324, whereas in the case of the server 1-3, the data analytic processes may include a task executor 326 and a data accessor 328. It will be apparent to those skilled in the art that other processor and storage device types, including various computer readable media, may be used to store and execute program instructions pertaining to the technique described herein. Also, while the description illustrates various processes, it is expressly contemplated that the various processes may be embodied as modules configured to operate in accordance with the technique herein (e.g., according to the functionality of a similar process).

In one or more embodiments, the metadata coordinator 322 contains computer executable instructions executed by the processor 310 to perform operations that manage the distributed file system namespace and control access to storage objects, such as datasets and/or partitioned data blocks thereof, residing on the shared storage system 200 and/or caches of the servers 1-3. Illustratively, the file system namespace operations may include, e.g., opening, closing and renaming of files and directories, as well as retrieving the partitioned data blocks of a dataset from the storage system for storage on the caches of the servers and tracking the locations of those data blocks in the system. The job coordinator 324 contains computer executable instructions executed by the processor 310 to perform operations that manage each analytics request (or "job") received from a client of the system 100. The job coordinator 324 may further perform operations to divide the job into sub-jobs (or "tasks"), assign/schedule the tasks among the servers 1-3, and communicate with the task executors running on the servers. As used herein, a task illustratively involves issuing a request for a data block (i.e., a data block request) that the task may subsequently process to produce a result.

Each task executor 326 contains computer executable instructions executed by the processor 310 to perform the tasks assigned to the server 1-3. The task executor 326 may communicate the data accessor 328 to retrieve one or more data blocks needed to process the assigned task. The data accessor 328 contains computer executable instructions executed by the processor 310 to perform operations that manage the local storage device (cache) of the server 1-3. Illustratively, the management operations may include access (e.g., read/write) operations directed to the data blocks stored on the cache and serviced by the data accessor 328, as well as data block creation, deletion and replication.

The distributed data processing system 100 illustratively provides a caching-based architecture that enhances the system to optimize distributed data analytics wherein multiple analytics jobs may be run on a dataset. To that end, the architecture may employ the data analytic processes/modules to store (a primary copy of) the dataset on the shared storage system 200 and partition the dataset into blocks of data for distribution and storage among the caches 120 of the caching layer 130 to enable processing of the data by the servers 1-3. In one or more embodiments, the architecture may further employ a distributed hash algorithm to calculate the locations of the data blocks in the system. If a data block is not available in a particular calculated location, e.g., in the cache of a respective server, the data block may be fetched from the dataset stored on the storage system 200 and forwarded to the respective server for storage on its cache 120. The data block may also be forwarded to another server requesting the data block so that future requests can be satisfied from the cache of the requesting server.

Embodiments described herein also provide a dynamic caching technique that adaptively controls the number of copies of data blocks stored within the caches ("cached copies") of the caching layer distributed among the servers of the distributed data processing system. A cache coordinator of the distributed system illustratively implements the dynamic caching technique to increase (i.e., replicate) the number of cached copies of the data blocks to thereby alleviate congestion in the system and improve processing performance of the servers. Alternatively, the technique may decrease (i.e., consolidate) the number of cached copies to thereby reduce excessive storage capacity and improve storage efficiency of the servers. In particular, the technique may increase the number of cached copies when it detects local and/or remote cache bottleneck conditions at the servers, a data popularity condition at the servers, or a shared storage bottleneck condition at the storage system. Otherwise, the technique may decrease the number of cached copies at the servers.

Figure 4:
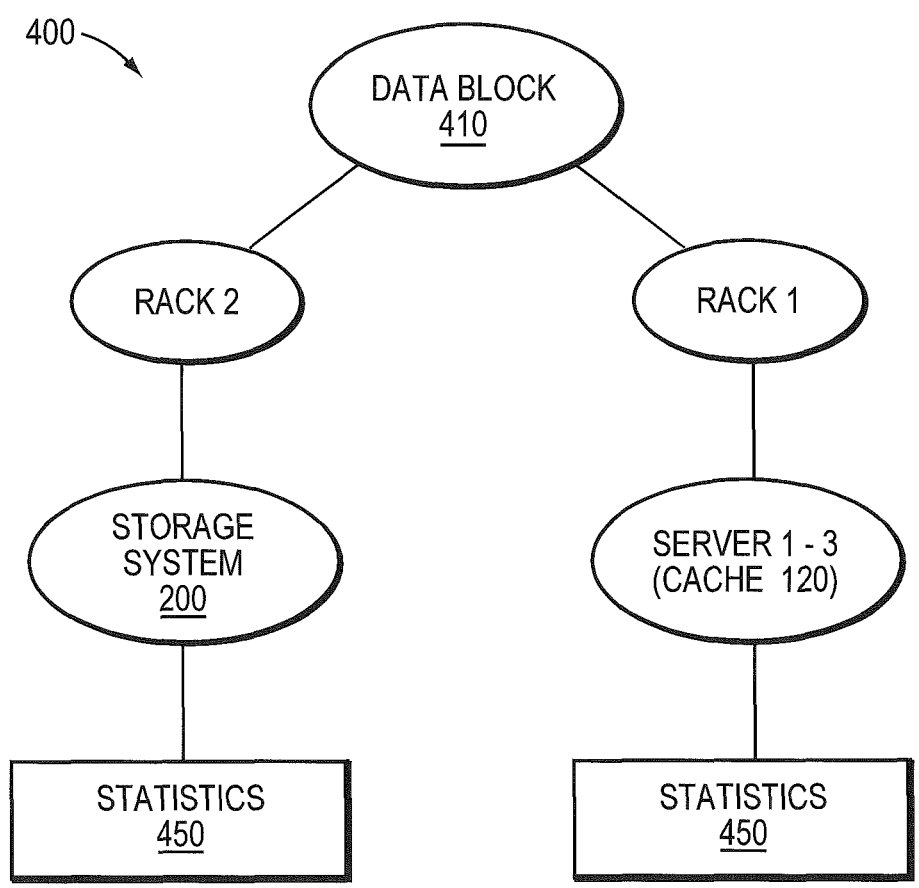
FIG. 4 is a block diagram of a statistics manager of the distributed data processing system.

In an embodiment, the cache coordinator 350 contains computer executable instructions executed by the processor 310 to perform operations that, as described herein, detect bottleneck conditions in the distributed system and adapt to those conditions by dynamically controlling the number of the cached copies within the distributed system 100. Although the cache coordinator 350 illustratively implements the dynamic caching technique, those skilled in the art will understand that the technique may be implemented within other distributed data analytics infrastructure that uses caching for performance optimizations. Illustratively, the cache coordinator 350 is embodied as a module of the management server that cooperates with the analytics computations of the processor and the underlying storage system to render (i.e., make) decisions to increase or decrease the cached copies of the data blocks stored in the caching layer 130 of the system. To that end, the cache coordinator 350 may cooperate with the metadata coordinator 322 and the statistics manager 400 to collect and maintain attributes and/or statistics pertaining to the data blocks stored on the servers (and storage system) of the distributed system in order to render the decisions regarding dynamic replication/consolidation FIG. 4 is a block diagram of statistics manager 400 that may be advantageously used with one or more embodiments described herein. Illustratively, the statistics manager 400 may be embodied as a tree data structure stored on the management server and configured to maintain collected statistics 450 for efficient decision-making. For example, the statistics manager may be organized to maintain statistics 450 for a data block 410 located on both the storage system 200 and one or more caches 130 of server 1-3. In an embodiment, the servers 1-3 are illustratively deployed within a physical structure or "rack" (e.g., Rack 1) while the storage system 200 is deployed within a different rack (e.g., Rack 2). Organization of the statistics manager as a tree structure allows efficient generation of what-if scenarios with the collected statistics. For instance, if cache 120 of server 1-3 was removed from the system, then the tree data structure enables efficient transfer of the removed cache statistics 450 to the storage system 200 and efficient determination of the amount of traffic the data block 410 would receive in the absence of the cache 120. Examples of statistics 450 maintained by the statistics manager 400 that may be advantageously used with the dynamic caching technique include, among others:

The caches/servers, as well as the storage system, in which each data block is present ("block placement")

The number of data block requests assigned/scheduled on each cache/server ("cache bandwidth usage")

The total number of data block requests that can be processed, in parallel, by a cache/server ("cache bandwidth threshold")

These statistics 450 may be updated either on each data block access or periodically as a group. For example, if a new data block is created, then the metadata coordinator 322 may cooperate with the data accessor 328 to update the statistics manager statistics to indicate creation of the new block. For accesses that occur in high volume (e.g., a read or write access of a particular data block), the statistics may be updated periodically; for example, the total number of accesses may be incremented by 1000 every 10 seconds if the particular block was accessed 1000 times in the last 10 seconds.

As noted, the dynamic caching technique may utilize the statistics to adaptively determine those data blocks that require additional cached copies to alleviate congestion, e.g., caused by a bottleneck condition, in the distributed system. To that end, the technique includes a replication phase directed to identifying one or more servers, as well as one or more data blocks, that contribute to congestion in the system. In particular, the cache coordinator 350 may utilize the statistics pertaining to the data blocks to compile a list of congested servers represented as {server, block} tuples. Illustratively, a server is considered congested when the number of data block requests assigned to the server (i.e., the cache bandwidth usage) exceeds the total number of data block requests that can be processed, in parallel, by the server (i.e, the cache bandwidth threshold). Note that the number of assigned data block requests may include data block requests directed to data blocks stored in the cache (i.e., total cache traffic) of the server, as well as remote data block requests directed to a data block (i.e., remote block traffic) originating from one or remote servers. In other words, even though the total cache traffic of the congested server may be less than the cache bandwidth threshold, there may be additional remote block traffic forwarded from one or more other servers that causes the cache bandwidth usage of the congested server to exceed the cache bandwidth threshold.

Figure 5:
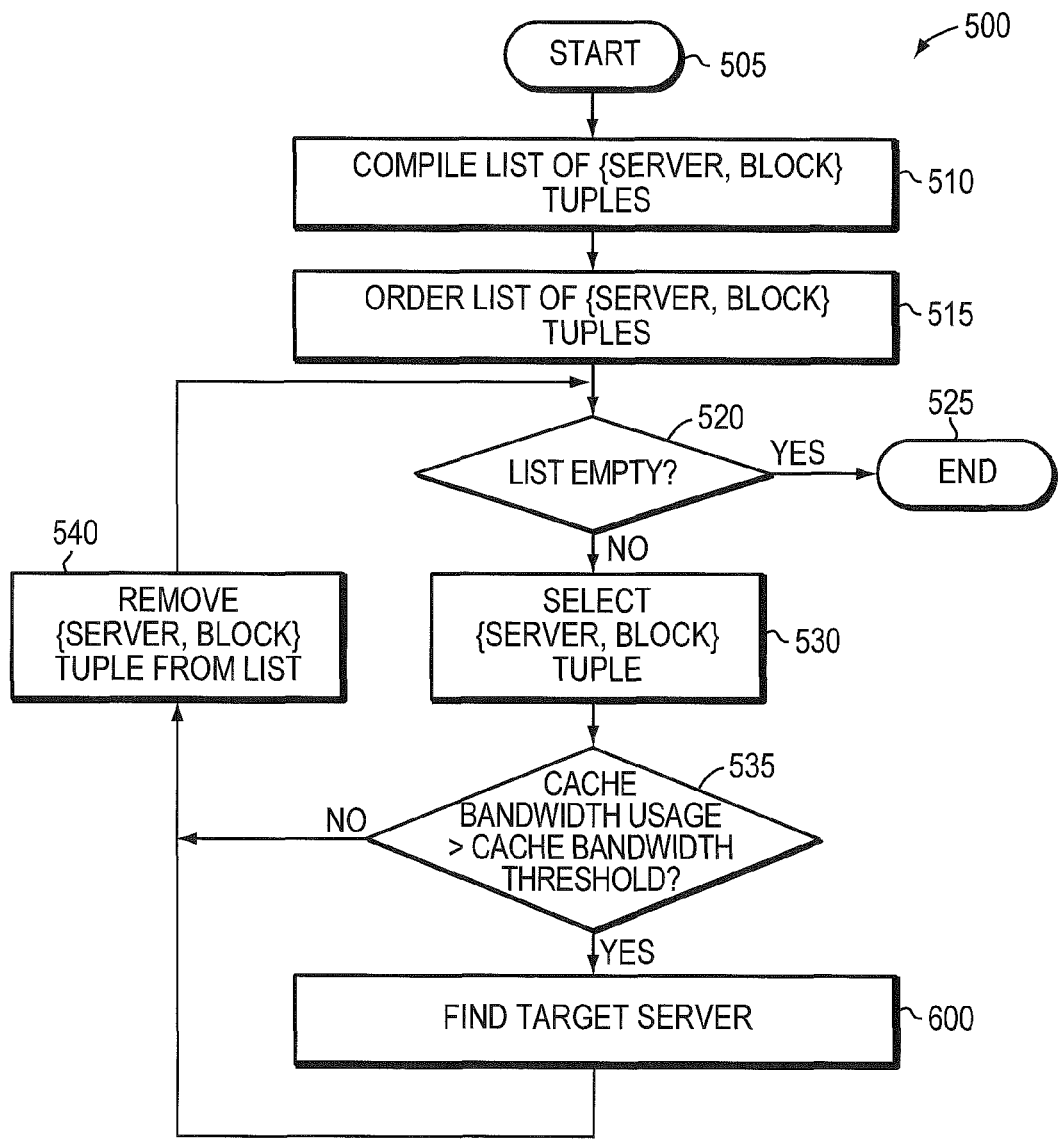
FIG. 5 is a flowchart illustrating a replication phase of a dynamic caching technique.

FIG. 5 is a flowchart illustrating the replication phase 500 of the dynamic caching technique. The replication phase starts at step 505 and proceeds to step 510 where a list of {server, block} tuples is compiled, e.g., from the statistics maintained by the statistics manager. In step 515, the list of {server, block} tuples is ordered according to a specified arrangement. In an embodiment, the list may be initially arranged in descending order of total cache traffic at each server on the list, followed by a subsequent arrangement in descending order of remote block traffic at each server. As a result, the {server, block} tuples of the compiled list are arranged in an overall descending order, such that the most congested server is located at the top of the list and the least congested server is located at the bottom of the list.

At step 520, a determination is made as to whether the compiled list is empty. If so, the routine ends at step 525. Otherwise, a {server, block} tuple (e.g., the tuple located at the top of the compiled list) is selected at step 530 and, at step 535, a determination is made as to whether the cache bandwidth usage of the server serving the data block of the tuple (i.e., the source server) is greater than the cache bandwidth threshold. If not, the sequence proceeds to step 540 where the {server, block} tuple is removed from the compiled list, and then returns to step 520. However, if the cache bandwidth usage is greater than the cache bandwidth threshold, then the sequence proceeds to a find_target_server routine (step 600) where a server within the distributed system (i.e., a target server) is identified and selected for replication of the data block, as described in connection with FIG. 6. Upon completion of the find_target_server routine, a determination is made as to whether the compiled list is empty (step 520). If not, the sequence proceeds to step 530; otherwise, the replication phase ends at step 525.

In an embodiment, the find_target_server routine 600 compiles a list of all potential target servers in the system and orders the servers of the list according to statistics such as number of assigned tasks, block placement of the data block, and racks of the source and target servers. As noted, the number of assigned tasks may include the total cache traffic as well as remote block traffic. Note also that the rack is a statistic used in the ordering consideration because redirection of traffic to a target server in a remote rack requires traversal of multiple intermediate "hops" (e.g., network switches). Typically, each rack may include a network switch, while another switch may be needed to connect multiple racks. Thus, if remote block traffic is redirected from a source server in a local rack to a target server in a remote rack, the traffic may traverse three (3) network switches, which introduces network latency into the system. Another statistic that may be used in the ordering consideration of the routine is to prefer a potential target server that currently has the data block in its cache so as to obviate any copying/replication operation.

Figure 6:
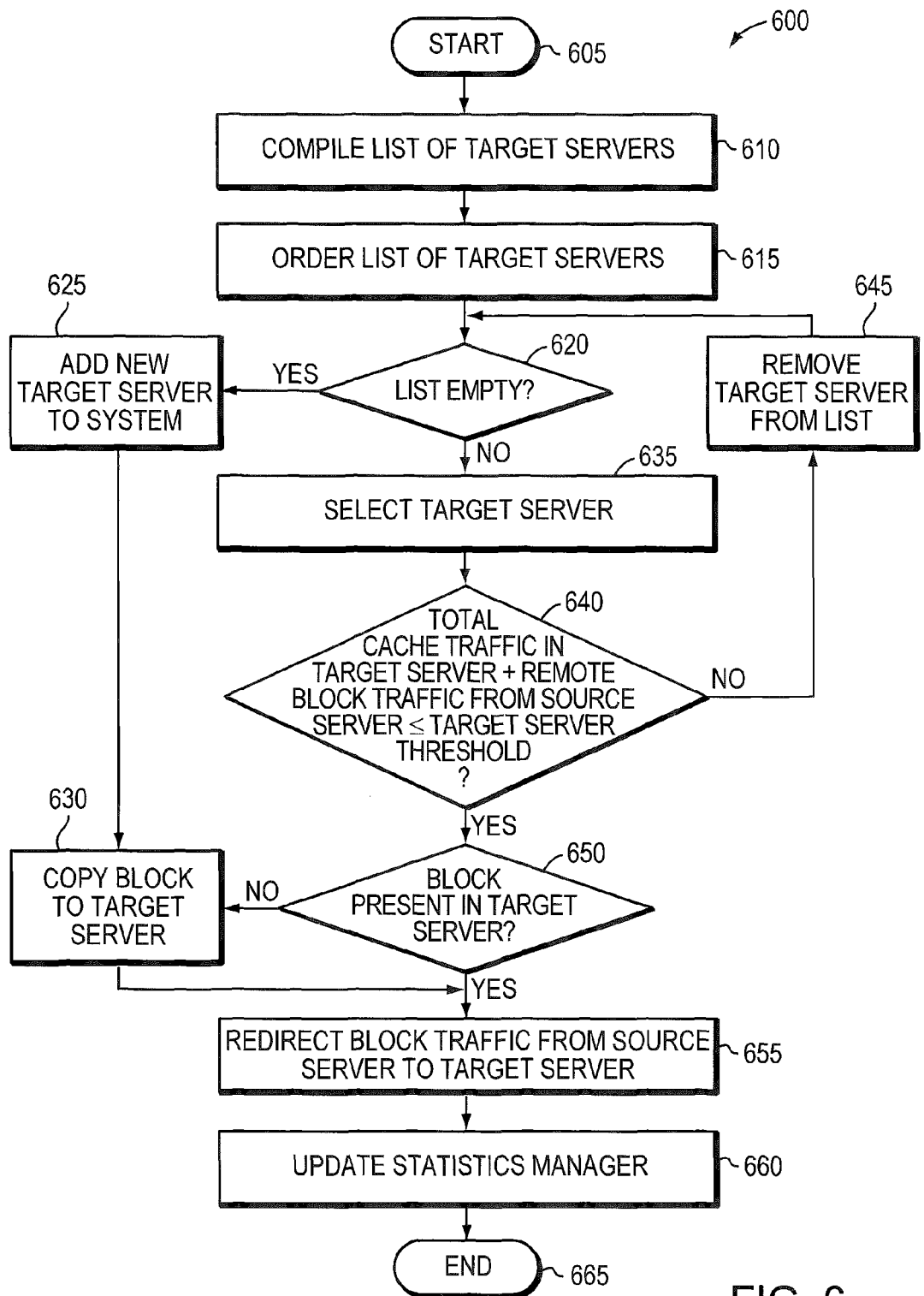
FIG. 6 is a flowchart illustrating a find_target_server routine of the dynamic caching technique.

FIG. 6 is a flowchart illustrating the find_target_server routine 600 of the dynamic caching technique. The routine starts at step 605 and proceeds to step 610 where a list of target servers is compiled, e.g., from the statistics maintained by the statistics manager. In step 615, the list of target servers is ordered according to a specified arrangement. In an embodiment, the list may be initially arranged in ascending order of total cache traffic such that the target server located at the top of the list is the least congested server. The list may then be further ordered by placing all servers that currently store the data block at the top of the list, followed by a subsequent placement of all servers in the same rack as the source server at the top of the list.

At step 620, a determination is made as to whether the compiled list is empty. If so, the routine proceeds to step 625 where a new server is added to the system as the target server, then to step 630 where the data block is copied (e.g., from either the source server or storage system) to the target server and thereafter to step 655 described below. However if the list is not empty, the routine proceeds to step 635 where a target server (e.g., the server located at the top of the compiled list) is selected. At step 640, a determination is made as to whether the total cache traffic in the target server plus (+) the remote block traffic from the source server is less than or equal to the cache bandwidth threshold of the target server ("target server threshold"). If not, the routine proceeds to step 645 where the target server is removed from the compiled list and then returns to step 620. Yet if the total cache traffic in the target server plus the remote block traffic from the source server is less than or equal to the target server threshold, then the routine proceeds to step 650 where a determination is made as to whether the data block is present in the target server. If not, the data block is copied (e.g., from either the source server or storage system) to the target server at step 630. If the block is present in the target server, the routine proceeds to step 655 where the data block request (traffic) at the source server is redirected to the target server and, at step 660, the statistics manager is updated. The routine then ends at step 665 and returns to step 520 of the replication phase 500.

In one or more embodiments, the caching-based architecture of the distributed system may also employ cache aware scheduling. For example, if a data block is present in the cache of a server, tasks requiring that block may be scheduled on that server. In a distributed analytics framework, multiple jobs may be run on the same set of information. In such cases, tasks pertaining to different jobs that require the same data block may be scheduled on the same server. However, it is possible that the server may not be able to satisfy all of the scheduled tasks requiring the data block. Note that these tasks (including data block requests) may be scheduled on the same server as the cache (i.e, total cache traffic), they may originate from a server remote from the cache (i.e., remote block traffic), or they may be combination of both traffic. As a result, the chance of occurrence of a local cache bottleneck condition at the server is substantially high.

Figure 7:
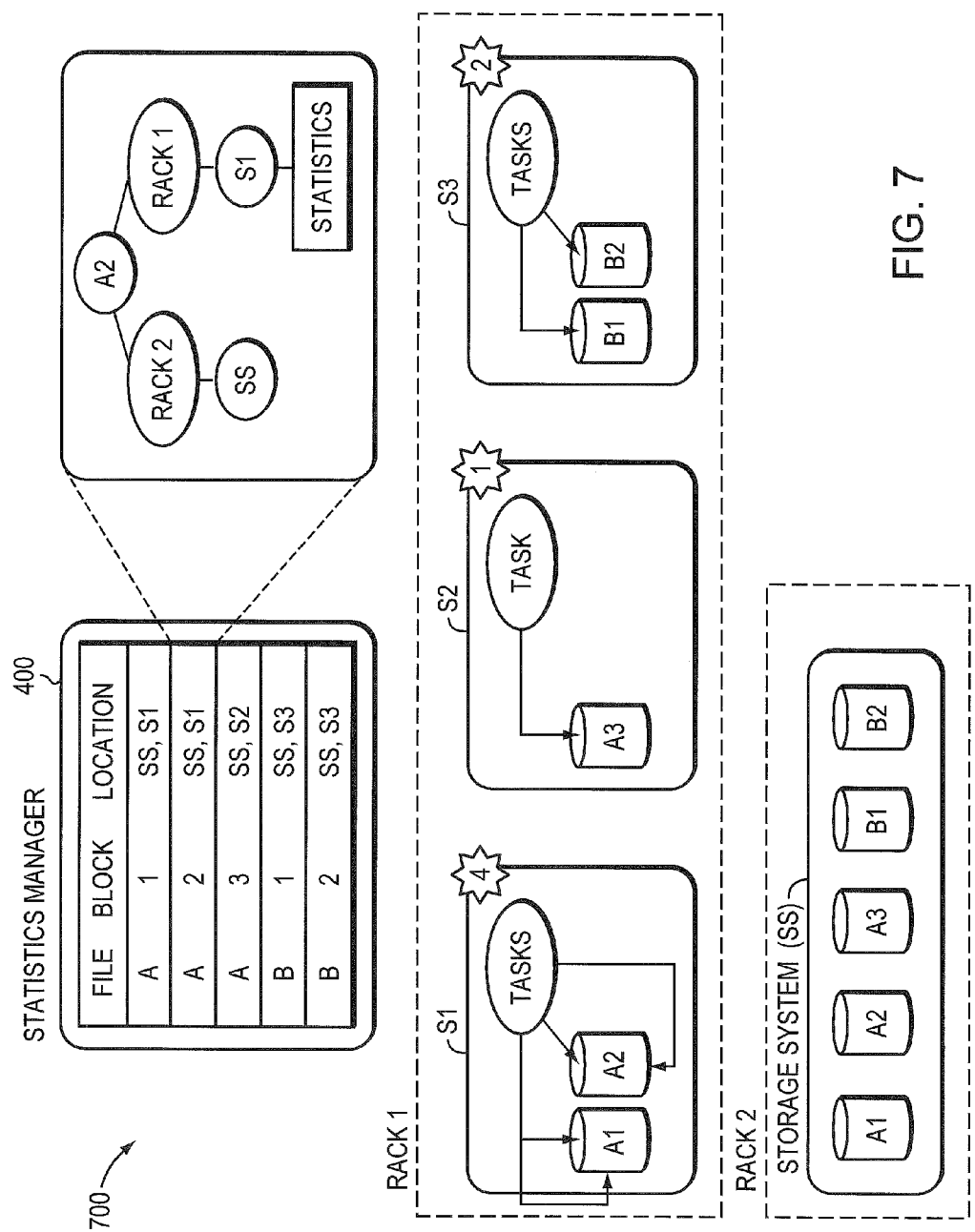
FIG. 7 is a block diagram of an example distributed data processing system illustrating a local cache bottleneck condition.

FIG. 7 is a block diagram of an example distributed data processing system 700 illustrating a local cache bottleneck condition. Assume that a server can process up to three (3) tasks, in parallel, directed to data blocks stored on its cache. Also assume that several analytics jobs are running on the same dataset. The example system 700 illustrates initial block placements, as well as initial scheduled tasks, among the servers 1-3 of the system 700 prior to implementation of the dynamic caching technique. Any server with more than three scheduled tasks is considered bottlenecked. Here, server 1 (S1) has four locally scheduled tasks directed to data blocks A1 and A2, server 2 (S2) has one locally scheduled task directed to data block A3, and server 3 (S3) has two locally scheduled tasks directed to data blocks B1 and B2. Thus, the number of scheduled tasks in S1 exceeds the available cache bandwidth of the server, leading to a local cache bottleneck. The statistics manager 400 maintains statistics relating to every block of data; an example of those statistics is shown in FIG. 7. Referring also to FIGS. 5-6, the replication phase 500 and the find_target_server routine 600 of the dynamic caching technique may operate as follows.

Broadly stated, the replication phase may be executed to compile and order a list of all congested {server, block} tuples in the system, resulting in, e.g., [{S1, A2}, {S1, A1}]. Since the list is not empty, the tuple at the top of the list, e.g., {S1, A2}, may be selected and a determination made that the cache bandwidth usage of S1 (4) is greater than the cache bandwidth threshold (3). Therefore, the find_target_server routine 600 may be invoked (i.e., activated) to compile and order a list of possible target servers for block A2 from the source server S1, resulting in [S2, S3]. Since the list is not empty, the server at the top of the list (S2) may be selected as a possible target server. A determination is then made that the total cache traffic in the target server (1) plus the remote block traffic from the source server (2) is less than or equal to the threshold (3). Further, a determination is made that the data block (A2) is not present in the target server (S2). Thus, data block (A2) is copied to the target server, the (A2) block traffic from the source server (S1) is redirected to the target server (S2), and the statistics manager is updated. The routine 600 then returns to the replication phase 500 where a determination is made that the list is not empty, the next tuple {S1, A1} in the list is selected and a determination is made that the cache bandwidth usage of S1 (2) is not greater than the threshold (3). Since there are no other tuples in the list, the replication phase ends.

Figure 8:
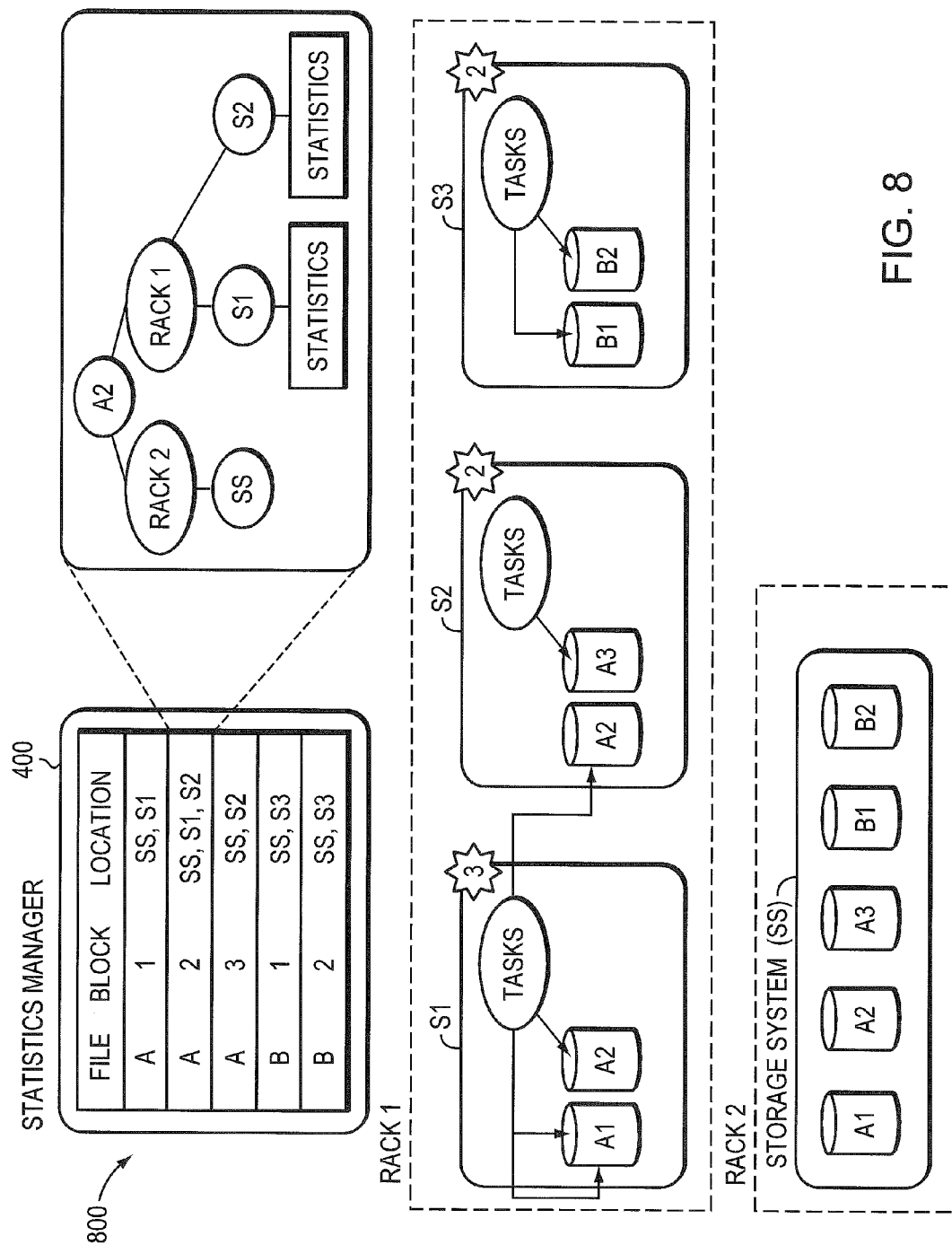
FIG. 8 is a block diagram of an example distributed data processing system illustrating reduction of the local cache bottleneck condition in accordance with the dynamic caching technique.

Accordingly, the dynamic caching technique may operate to replicate the block of data among one or more caches of the servers to thereby reduce the local cache bottleneck condition in the system. Specifically, data block A2 is replicated to S2 in the same rack; accordingly, the job coordinator process 324 may choose to schedule tasks directed to data block A2 in either S1 or S2 to thereby reduce the local cache bottleneck condition. FIG. 8 is a block diagram of an example distributed data processing system 800 illustrating reduction of the local cache bottleneck condition in accordance with the dynamic caching technique. The example system 800 illustrates block placements, as well as scheduled tasks, among the servers 1-3 of the system after implementation of the dynamic caching technique. As can be seen, the number of scheduled tasks (including data block requests) in S1 has been reduced from four to three, while the number of scheduled tasks in S2 has been increased from one to two. In the presence of a block copy in the local cache, rebalancing may take place (rather than redirection) to reduce the number of remote data block requests and, thus, improve performance. Notably, the number of scheduled tasks in S1 does not exceed the available cache bandwidth of the server and the bottleneck condition at S1 has been reduced. It should be noted that future tasks requiring data block A2 can be scheduled either in S1 or S2 to thereby prevent a future local cache bottleneck.

Although the caching-based architecture may employ cache aware scheduling, i.e., a task may be scheduled on a server whose cache stores the data block to be processed by that task, each server can only support a limited number of tasks (referred to as "slots"). If the slots are already occupied by existing tasks, new tasks (including data block requests) may be scheduled in a different server, resulting in remote cache traffic from the server to the different server. Remote cache traffic incurs a performance overhead, thereby causing a remote cache bottleneck condition, as the requested data block requests (and possibly the data block) traverse a set of network switches. Typically, there may be a substantial amount of remote traffic in the system. The dynamic caching technique may create a copy of the data block in the cache of a nearby server, thereby reducing the remote cache bottleneck condition.

Figure 9:
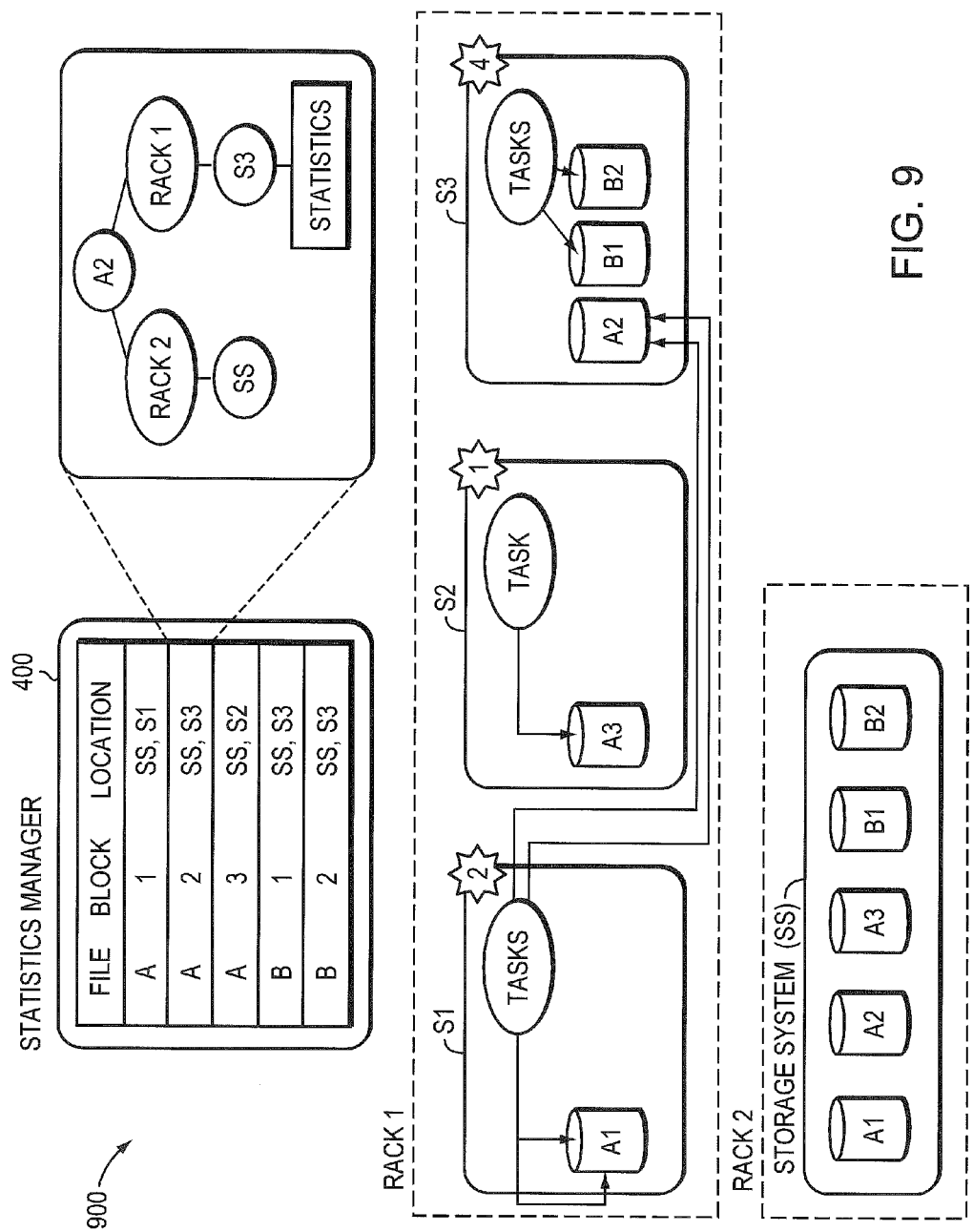
FIG. 9 is a block diagram of an example distributed data processing system illustrating a remote cache bottleneck condition.

FIG. 9 is a block diagram of an example distributed data processing system 900 illustrating a remote cache bottleneck condition. Again, assume that a server can process up to three tasks, in parallel, directed to data blocks stored on its cache and that several analytics jobs are running on the same dataset. The example system 900 illustrates initial block placements, as well as initial scheduled tasks, among the servers 1-3 of the system 900 prior to implementation of the dynamic caching technique. Here, S1 has two locally scheduled tasks directed to data block A1 and S2 has one locally scheduled task directed to data block A3. However, S3 has two locally scheduled tasks directed to data blocks B1 and B2, and two remote task requests from S1 directed to data block A2. As noted, any server with more than three scheduled tasks is considered bottlenecked; accordingly, S3 is bottlenecked. The statistics manager 400 maintains statistics relating to every block of data; an example of those statistics is shown in FIG. 9. Referring also to FIGS. 5-6, the replication phase 500 and the find_target_server routine 600 of the dynamic caching technique may operate as follows.

Broadly stated, the replication phase may be executed to compile and order a list of all congested {server, block} tuples in the system, resulting in, e.g., [{S3, A2}, {S3, B1}, {S3, B2}]. Since the list is not empty, the tuple at the top of the list, e.g., {S3, A2}, may be selected and a determination made that the cache bandwidth usage of S3 (4) is greater than the cache bandwidth threshold (3). Accordingly, the find_target_server routine 600 may be invoked to compile and order a list of possible target servers for block A2 from the source server S3, resulting in [S1, S2]. Since the list is not empty, the server at the top of the list (S1) may be selected as a possible target server. A determination is then made that the total cache traffic in the target server (2) plus the remote block traffic from the source server (2) is not less than or equal to the threshold (3). Therefore, the possible target server (S1) is removed from the list and the next server at the top of the list (S2) may be selected as a possible target server. A determination is then made that the total cache traffic in the target server (1) plus the remote block traffic from the source server (2) is less than or equal to the threshold (3). Furthermore, a determination is made that the data block (A2) is not present in the target server (S2). Thus, data block (A2) is copied to the target server, the (A2) block traffic from the remote server (S1) to the source server (S3) is redirected to the target server (S2), and the statistics manager is updated. The routine 600 then returns to the replication phase 500 where a determination is made that the list is not empty, the next tuple {S3, B1} in the list is selected and a determination is made that the cache bandwidth usage of S3 (2) is not greater than the threshold (3). As a result, the next tuple {S3, B2} in the list is selected and a determination made that the cache bandwidth usage of S3 (2) is not greater than the cache bandwidth threshold (3). Since there are no other tuples in the list, the replication phase ends.

Figure 10:
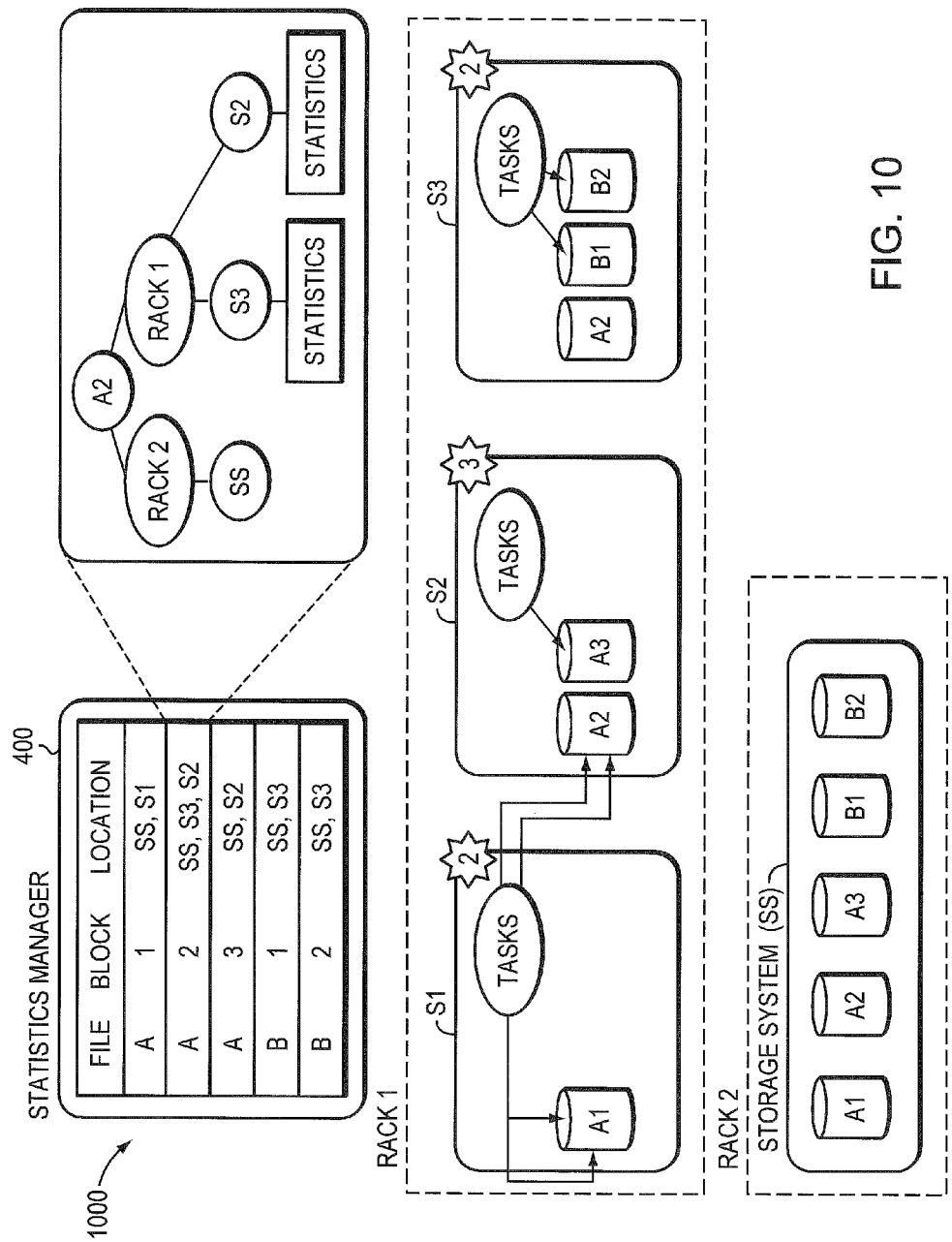
FIG. 10 is a block diagram of an example distributed data processing system illustrating reduction of the remote cache bottleneck condition in accordance with the dynamic caching technique.

Accordingly, data block A2 is replicated to S2 in the same rack and tasks from S1 requiring the data block A2 may be redirected to S2 to thereby reduce the remote cache bottleneck condition at S3. FIG. 10 is a block diagram of an example distributed data processing system 1000 illustrating reduction of the remote cache bottleneck condition in accordance with the dynamic caching technique. The example system 1000 illustrates block placements, as well as scheduled tasks, among the servers 1-3 of the system after implementation of the dynamic caching technique. As can be seen, the number of scheduled tasks in S3 has been reduced from four to two, while the number of scheduled tasks in S2 has been increased from one to three. Therefore, the number of scheduled tasks in S3 does not exceed the available cache bandwidth of the server and the bottleneck condition at S3 has been reduced.

Often, there may be data blocks that are "popular", i.e., frequently accessed, in a data analytics system. Data block popularity may occur because multiple jobs refer to the data block, the data block may be de-duplicated, and/or the analytics system speculatively spawns duplicate tasks during unexpected slowdown in the hope that one of the spawned tasks may complete successfully. In all of these scenarios, the data block may attract multiple requests from various servers, thereby degrading the server's performance. The dynamic caching technique may replicate the popular data block in one or more server locations illustratively close to the servers requesting the block. Having multiple copies of popular data blocks balances the request load among the servers of the distributed system and facilitates performance improvement of the system.

Figure 11:
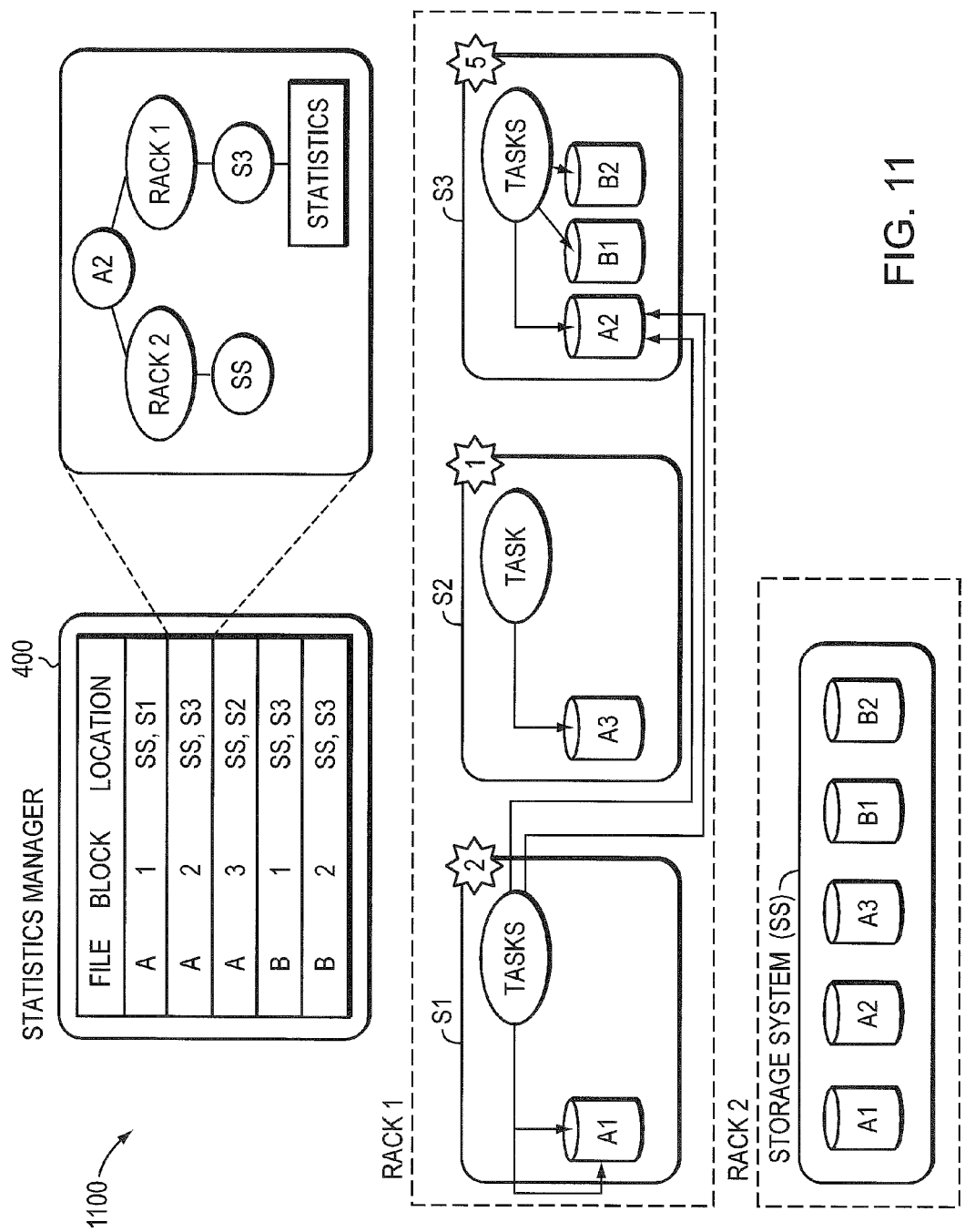
FIG. 11 is a block diagram of an example distributed data processing system illustrating a bottleneck caused by a data popularity condition.

FIG. 11 is a block diagram of an example distributed data processing system 1100 illustrating a bottleneck caused by a data popularity condition. Here, data block A2 is considered a popular data block because the requests that the data block attracts from both S3 and S1 exceed the maximum permissible limit of scheduled tasks (3). In particular, S1 has two locally scheduled tasks directed to data block A1 and S2 has one locally scheduled task directed to data block A3. However, S3 has two locally scheduled tasks directed to data blocks B1 and B2, and one locally scheduled task directed to data block A2, as well as two remote task requests from S1 directed to data block A2 for a total of five (5) tasks. Accordingly, S3 is bottlenecked. The statistics manager 400 maintains statistics relating to every block of data; an example of those statistics is shown in FIG. 11. Referring also to FIGS. 5-6, the replication phase 500 and the find_target_server routine 600 of the dynamic caching technique may operate as follows. Broadly stated, the replication phase may be executed to compile and order a list of all congested {server, block} tuples in the system, resulting in, e.g., [{S3, A2}, {S3, B1}, {S3, B2}]. Since the list is not empty, the tuple at the top of the list, e.g., {S3, A2}, may be selected and a determination made that the cache bandwidth usage of S3 (5) is greater than the cache bandwidth threshold (3). Accordingly, the find_target_server routine 600 may be invoked to compile and order a list of possible target servers for block A2 from the source server S3, resulting in [S1, S2]. Since the list is not empty, the server at the top of the list (S1) may be selected as a possible target server. A determination is then made that the total cache traffic in the target server (2) plus the remote block traffic from the source server (2) is not less than or equal to the threshold (3). Therefore, the possible target server (S1) is removed from the list and the next server at the top of the list (S2) may be selected as a possible target server. A determination is then made that the total cache traffic in the target server (1) plus the remote block traffic from the source server (2) is less than or equal to the threshold (3). Furthermore, a determination is made that the data block (A2) is not present in the target server (S2). Thus, data block (A2) is copied to the target server, the (A2) block traffic from the remote server (S1) to the source server (S3) is redirected to the target server (S2), and the statistics manager is updated. The routine 600 then returns to the replication phase 500 where the next tuple {S3, B1} in the list is selected and a determination made that the cache bandwidth usage of S3 (3) is not greater than the cache bandwidth threshold (3). As a result, the next tuple {S3, B2} in the list is selected and a determination made that the cache bandwidth usage of S3 (3) is not greater than the threshold (3). Since there are no other tuples in the list, the replication phase ends.

Figure 12:
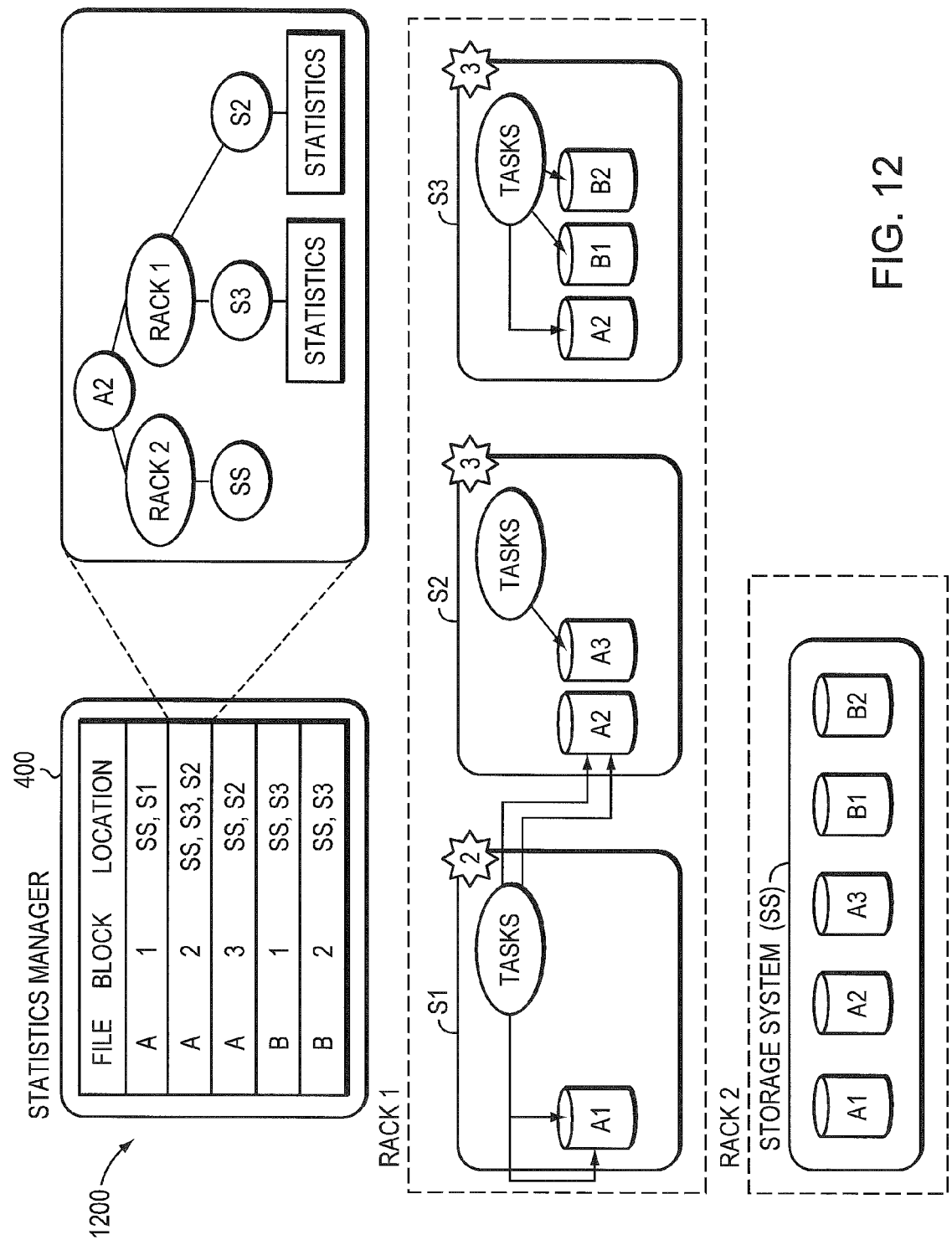
FIG. 12 is a block diagram of an example distributed data processing system illustrating reduction of the bottleneck caused by the data popularity condition in accordance with the dynamic caching technique

Accordingly, data block A2 is replicated to S2 in the same rack as S1, tasks (including data block requests) from S1 requiring the data block A2 may be redirected to S2, and tasks from S3 requiring the data block A2 may be satisfied locally, thereby reducing the bottleneck caused by the data popularity condition. FIG. 12 is a block diagram of an example distributed data processing system 1200 illustrating reduction of the bottleneck caused by the data popularity condition in accordance with the dynamic caching technique. The example system 1200 illustrates block placements, as well as scheduled tasks, among the servers 1-3 of the system after implementation of the dynamic caching technique. As can be seen, the number of scheduled tasks in S3 has been reduced from five to three, while the number of scheduled tasks in S2 has increased from one to three. Therefore, the number of scheduled tasks in S3 does not exceed the available cache bandwidth of the server and the bottleneck condition at S3 has been reduced.

While there have been shown and described embodiments that provide a dynamic caching technique to adaptively control a number of cached copies of data blocks stored within a caching layer distributed among servers of a distributed data processing system, it is to be understood that various other adaptations and modifications may be made within the spirit and scope of the embodiments herein. For example, the embodiments have been shown and described herein with relation to a replication phase of the dynamic caching technique that may increase the number of cached copies of a data block at the servers to reduce, e.g., bottleneck conditions in the system. However, the embodiments in their broader sense are not so limited, and may, in fact, be used with a consolidation phase of the dynamic caching technique that may consolidate cached copies of data blocks without affecting performance of the system. That is, the consolidation phase may be executed to reduce the number of cached copies of data blocks that may contribute to excessive storage capacity in the system. Note that the administrator may activate each of the replication/consolidation phases independently to correct a specific problem.

Figure 13:
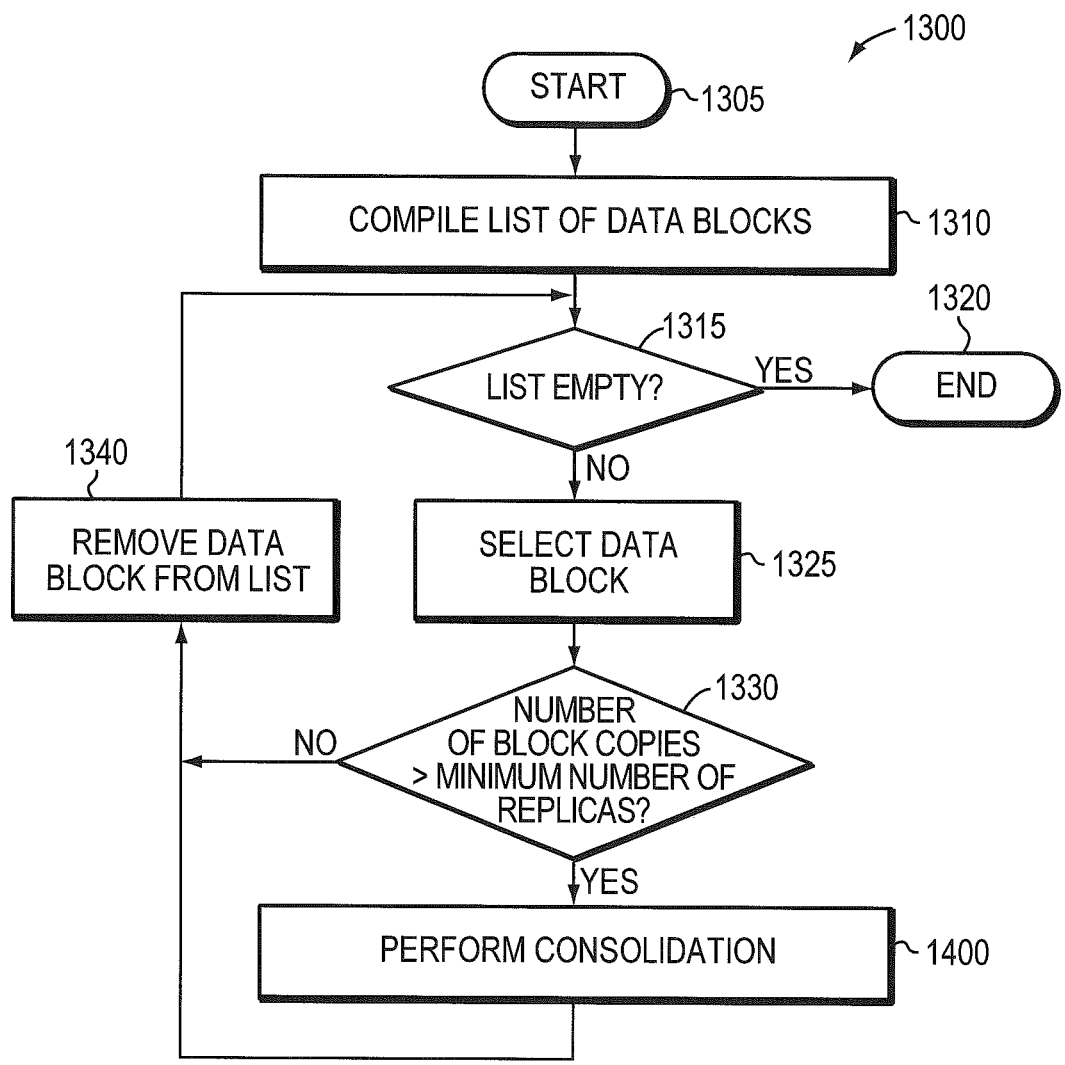
FIG. 13 is a flowchart illustrating a consolidation phase of the dynamic caching technique.

FIG. 13 is a flowchart illustrating the consolidation phase 1300 of the dynamic caching technique. The consolidation phase starts at step 1305 and proceeds to step 1310 where, after the replication phase, a list of data blocks is compiled from all servers that hold the same data block in the distributed system. In an embodiment, the data block of the {server, block} tuple selected in the replication phase is used to compile the list of data blocks, e.g., from the statistics maintained by the statistics manager. At step 1315, a determination is made as to whether the compiled list is empty. If so, consolidation phase ends at step 1320. Otherwise, the sequence proceeds to step 1325 where a data block is selected, e.g., from the top of the compiled list. At step 1330, a determination is made as to whether the number of copies of the data block is greater than a minimum number of replicas (i.e., copies of the data block). Illustratively, the minimum number of replicas may be specified by a replication factor, which is illustratively statically configured by an administrator. For example, the administrator may configure the distributed system with a replication factor of two (2), which denotes that, for each data block stored on the shared storage system 200, there may be a minimum of two copies of the data block replicated in two caches 120 of the system. If the number of copies of the data block is not greater than the minimum number of replicas, the sequence proceeds to step 1340 where the data block is removed from the compiled list, and then returns to step 1315. However, if the number of copies of the data block is greater than the minimum number of replicas, the sequence proceeds to step 1400 where consolidation is performed in accordance with a consolidate_block routine, as described in connection with FIG. 14. Upon completion of the consolidate_block routine, a determination is made as to whether the compiled list is empty (step 1315). If not, the sequence proceeds to step 1325; otherwise, the consolidation phase ends at step 1320.

Figure 14:
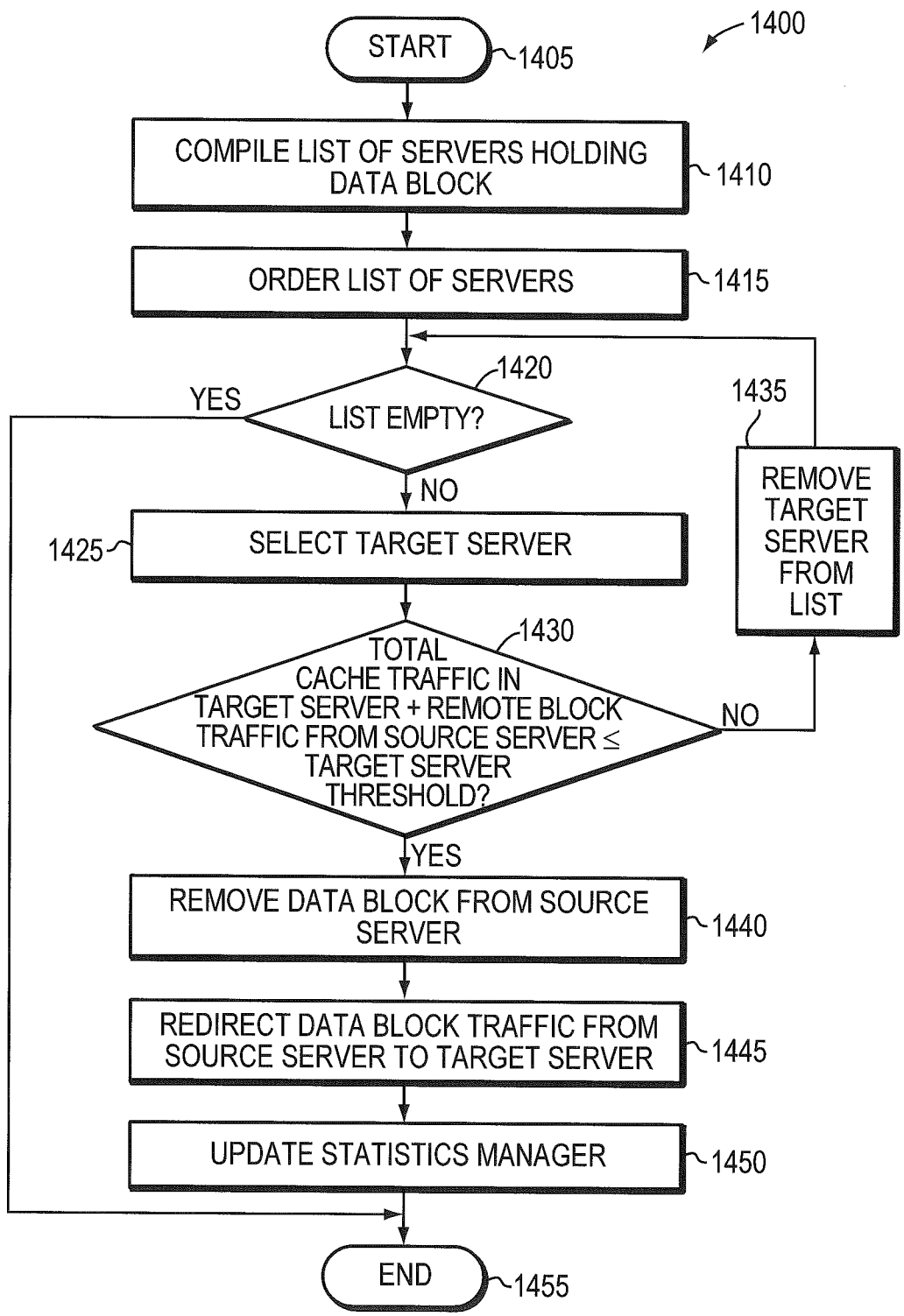
FIG. 14 is a flowchart illustrating a consolidate_block routine of the dynamic caching technique.

FIG. 14 is a flowchart illustrating the consolidate_block routine 1400 of the dynamic caching technique. The routine starts at step 1405 and proceeds to step 1410 where a list of servers that hold copies of the data block is compiled, e.g., from the statistics maintained by the statistics manager. Note that the compiled list of servers is illustratively derived from a list of {server, block} tuples, wherein the server holding a copy of the data block to be consolidated is the source server. At step 1415, the list of servers is ordered according to a specified arrangement. In an embodiment, the list may be initially arranged in ascending order of total traffic accesses for the data block such that the server located at the top of the list has the least amount of block accesses during a specified period of time, e.g., 60 seconds. In addition, the list may be ordered by placing servers in the same rack at the top of the list. At step 1420, a determination is made as to whether the compiled list is empty. If so, the routine ends at step 1455 and returns to step 1315 of the consolidation phase 1300. If the list is not empty, the routine proceeds to step 1425 where a target server (e.g., the server located at the top of the compiled list) is selected. At step 1430, a determination is made as to whether the total cache traffic in the target server plus (+) the remote block traffic from the source server is less than or equal to the cache bandwidth threshold of the target server ("target server threshold"). If not, the routine proceeds to step 1435 where the target server is removed from the complied list and then returns to step 1420. Yet if the total cache traffic in the target server plus the remote block traffic from the source server is less than or equal to the target server threshold, then the routine proceeds to step 1440 where the data block is removed from the source server. At step 1445, the data block traffic (if any) at the source server is redirected to the target server and, at step 1450, the statistics manager is updated. The routine then ends at step 1455.

Figure 15:
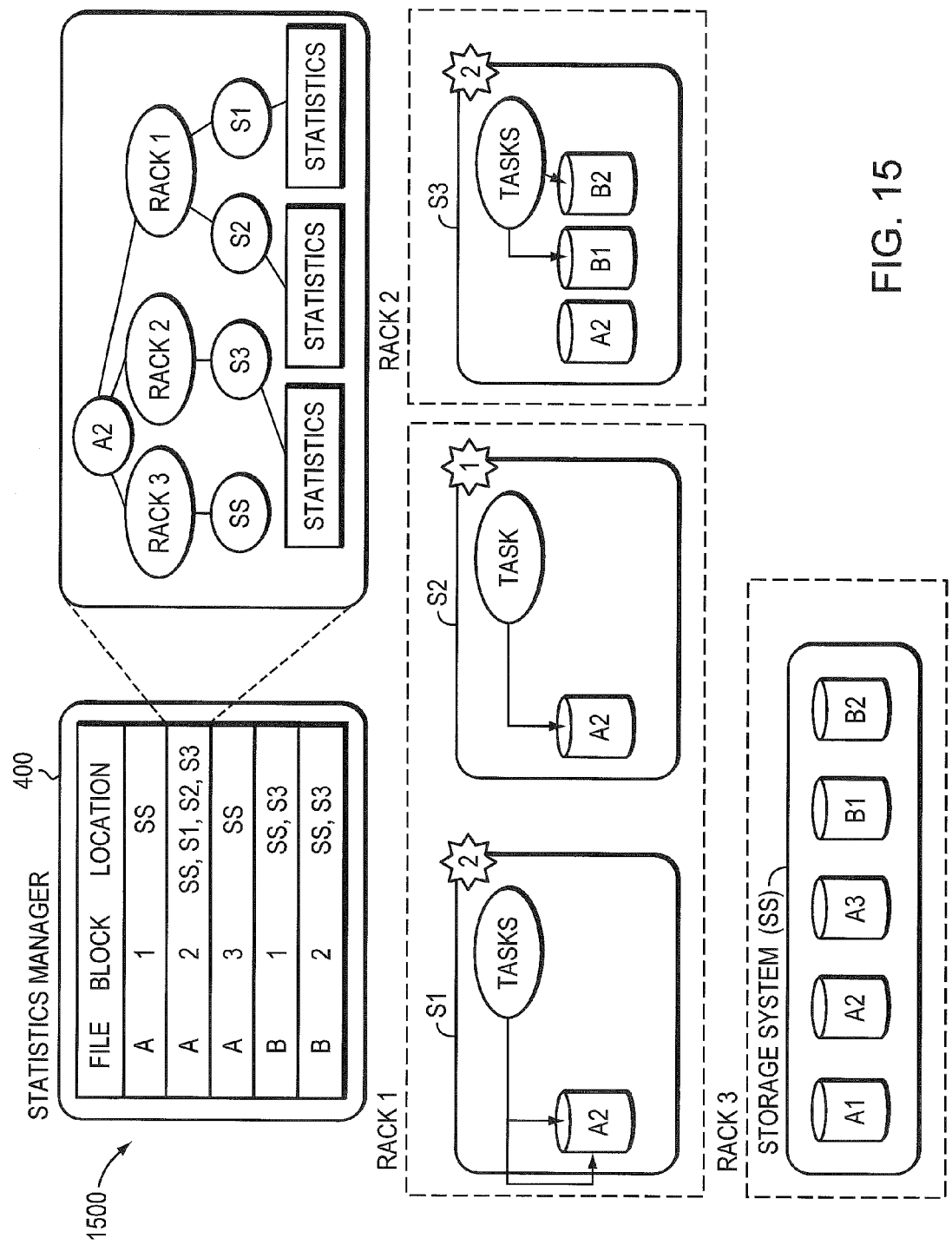
FIG. 15 is a block diagram of an example distributed data processing system prior to implementation of the consolidation phase of the dynamic caching technique.
Figure 16:
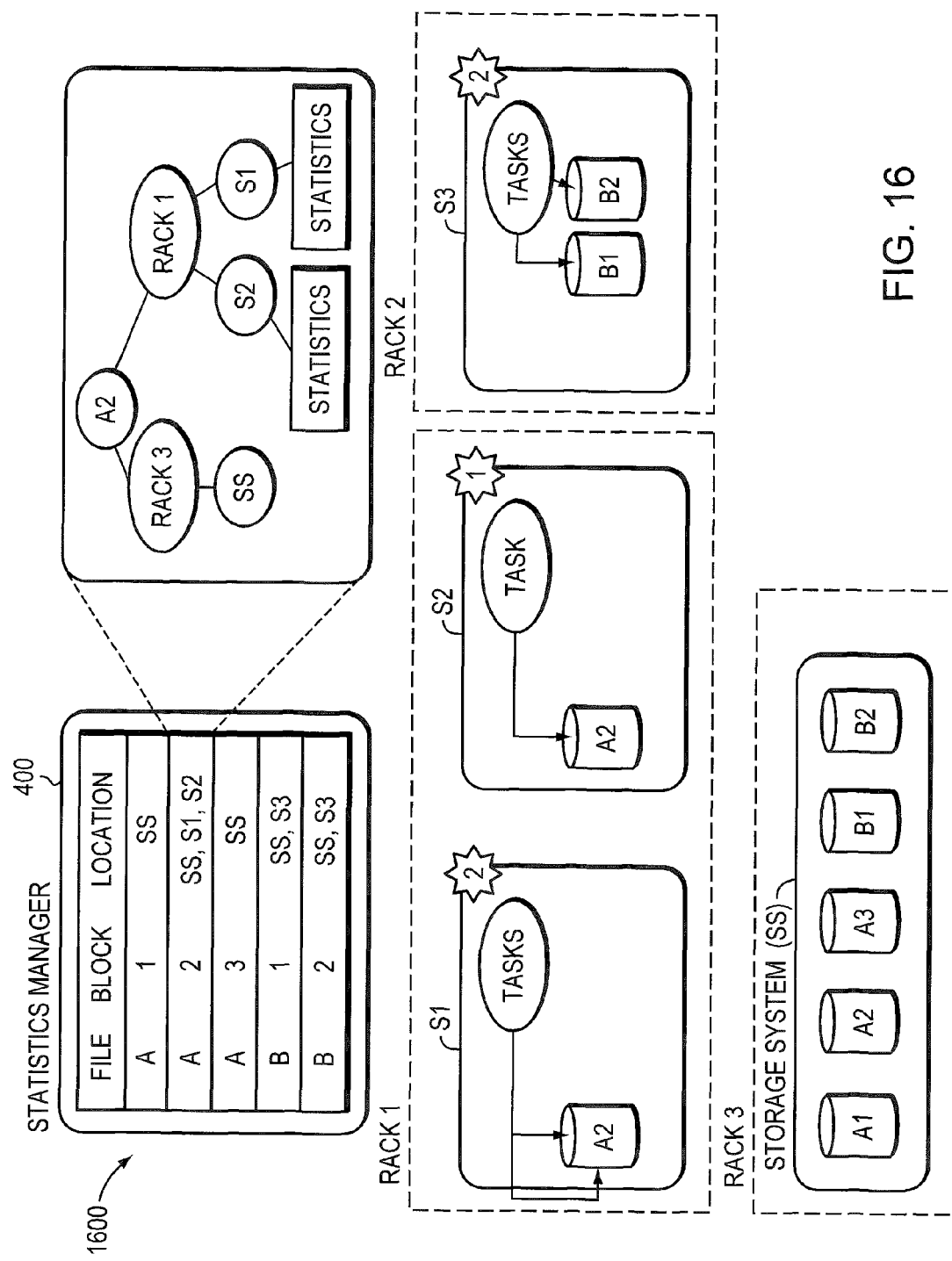
FIG. 16 is a block diagram of an example distributed data processing system after implementation of the consolidation phase of the dynamic caching technique.

FIG. 15 is a block diagram of an example distributed data processing system 1500 prior to implementation of the consolidation phase of the dynamic caching technique. Assume that the minimum number of replicas is two (2). Here, there are a total of three (3) copies of data block A2; thus data block A2 is chosen for consolidation. FIG. 16 is a block diagram of an example distributed data processing system 1600 after implementation of the consolidation phase of the dynamic caching technique. As can be seen, copies of data block A2 have been consolidated such that are only two (2) copies of the data block remaining in the caches to thereby reduce excessive storage capacity in the system.

In one or more embodiments, the dynamic caching technique described herein may be triggered: i) automatically by the system, ii) manually by an administrator during maintenance, and iii) manually by the administrator to correct a performance problem. Maintenance activities that require administrator intervention may include backups, hardware upgrades and software upgrades. The administrator may choose to manually trigger the dynamic caching technique to correct a performance bottleneck in the system; the bottleneck may occur at either the storage system level, the caching layer level or the application level. The administrator may also control the degree of automation by overriding the parameters of the system, e.g., the administrator may choose to correct the replication factor for the top 50% of the blocks currently experiencing a problem.

Advantageously, the dynamic caching technique adaptively controls the number of copies of data blocks stored within caches ("cached copies") of the caching layer to optimize distributed analytics running on the shared storage infrastructure of the distributed system. That is, the dynamic caching technique may increase or decrease the number of cached copies of data blocks to allow users greater flexibility and address problems that customers may encounter in an enterprise environment, such as bottlenecks, failures, and system reconfigurations. The dynamic technique also allows users to balance between performance and storage efficiency.

The foregoing description has been directed to specific embodiments. It will be apparent, however, that other variations and modifications may be made to the described embodiments, with the attainment of some or all of their advantages. For instance, it is expressly contemplated that the components and/or modules described herein can be implemented as software being stored on a tangible (non-transitory) computer-readable medium (e.g., disks and/or CDs) having program instructions executing on a computer, hardware, firmware, or a combination thereof. It is further contemplated that the various processes, modules, architectures and procedures described herein may be implemented in hardware, firmware or software. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a plurality of servers including storage devices, each server embodied as a computer having a processor;
a statistics manager configured to maintain statistics comprising on which storage devices of which of the plurality of servers data blocks are stored, a number of data block requests associated with each server, and a cache bandwidth threshold for each server; and
a cache coordinator configured to utilize the statistics to implement one of a replication phase and a consolidation phase of a dynamic caching technique that adaptively controls a number of copies of a data block stored on one or more of the storage devices, the cache coordinator further configured to cooperate with the processor to execute the replication phase of the dynamic caching technique to increase the number of copies of the data block stored on the one or more storage devices, the replication phase when executed operable to:
determine that a number of data block requests associated with a source server of the plurality of servers exceeds the cache bandwidth threshold for the source server that comprises a total number of data block requests that can be processed by the source server, the number of data block requests associated with the source server including one or more data block requests directed to the data block;
determine that a number of data block requests associated with a target server of the plurality of servers is less than or equal to the cache bandwidth threshold for the target server that comprises a total number of data block requests that can be processed by the target server;
copy the data block to the storage device of the target server based on the determination; and
redirect the one or more data block requests directed to the data block at the source server to the copied data block at the target server to alleviate congestion in the system; and
the cache coordinator is further configured to cooperate with the processor to execute the consolidation phase to decrease the number of copies of the data block, the consolidation phase when executed operable to:
determine that the number of copies of the data block is greater than a minimum number of replicas in the system;
determine that the number of data block requests assigned to the target server is less than or equal to the total number of data block requests that can be processed by the target server, the number of data block requests assigned to the target server including one or more data block requests directed to the data block at the source server;
remove the data block from the source server; and
redirect the one or more data block requests directed to the removed data block at the source server to the target server to improve storage efficiency in the system.

2. The system of claim 1 wherein the storage devices are embodied as caches configured to provide a caching layer of the system, the system further comprising a storage system connected to the servers, the storage system configured to cooperate with the caches of the servers to provide a shared storage infrastructure of the system.

3. The system of claim 2 wherein the storage system is configured to store a dataset that is partitioned into blocks of data, including the data block, for storage on the one or more caches of the caching layer.

4. The system of claim 3 further including one or more data analytic modules configured to track locations of the partitioned blocks of data stored on the one or more caches.

5. The system of claim 4 wherein the one or more data analytic modules includes a metadata coordinator module configured to perform operations that control access to the dataset and/or partitioned blocks.

6. The system of claim 2 wherein the statistics manager is embodied as a tree data structure to maintain the statistics pertaining to the data block located on the storage system and one or more caches of the servers.

7. The system of claim 1 wherein the minimum number of replicas is specified by a replication factor.

8. The system of claim 1, wherein the replication phase when executed is further operable to:
arrange each server from the plurality of servers in a first list ordered in descending order of total cache traffic at each server, the total cache traffic being based on the statistics maintained by the statistics manager;
identify a subset of target servers from among the plurality of servers based on the statistics maintained by the statistics manager;

arrange each target server from the subset of target servers in a second list in ascending order of total cache traffic at each target server, the total cache traffic being based on the statistics maintained by the statistics manager; and select a server at the top of the first list as the source server and a server at the top of the second list as the target server.

9. A method comprising:

maintaining statistics pertaining to data blocks stored on servers of a distributed processing system, each server including a processor configured to execute a dynamic caching technique that adaptively controls a number of copies of a data block stored on the servers;

utilizing the statistics to implement a replication of the dynamic caching technique;

executing the replication phase of the dynamic caching technique to increase the number of copies of the data block, the replication phase comprising:

determining that a number of data block requests assigned to a source server of the distributed processing system exceeds a total number of data block requests that can be processed by the source server, the number of data block requests assigned to the source server including one or more data block requests directed to the data block;

determining that a number of data block requests assigned to a target server of the distributed processing system plus anticipated remote block traffic from the source server directed to the data block is less than or equal to a total number of data block requests that can be processed by the target server;

copying the data block to the target server in response to the determining; and redirecting the one or more data block requests directed to the data block from the source server to the copied data block at the target server to alleviate congestion in the distributed processing system; and executing a consolidation phase of the dynamic caching technique to decrease the number of copies of the data block, the consolidation phase comprising:

determining that the number of copies of the data block is greater than a minimum number of replicas in the distributed system;

determining that the number of data block requests assigned to the target server of the distributed system is less than or equal to the total number of data block requests that can be processed by the target server, the number of data block requests assigned to the target server including one or more data block requests directed to the data block at the source server;

removing the data block from the source server; and redirecting the one or more data block requests directed to the removed data block at the source server to the target server to improve storage efficiency in the distributed system.

10. The method of claim 9 further comprising:

storing the data blocks on storage devices of the servers; and embodying the storage devices as caches of the servers.

11. The method of claim 10 further comprising:

organizing the caches of the servers to provide a caching layer of the distributed processing system.

12. The method of claim 11 further comprising:

coupling a storage system to the servers; and configuring the storage system to cooperate with the caches of the servers to provide a shared storage infrastructure of the system.

13. The method of claim 12 further comprising:

storing a dataset on the storage system;

partitioning the dataset into blocks of data, including the data block; and storing the blocks of data on one or more of the caches of the distributed processing system.

14. The method of claim 13 wherein the maintaining statistics comprises organizing a tree data structure to maintain the statistics pertaining to the data block stored on the storage system and the one or more caches of the servers.

15. The method of claim 9 further comprising:

specifying the minimum number of replicas by a replication factor.

16. A distributed data processing system comprising:

a plurality of servers including storage devices embodied as caches configured to provide a caching layer of the distributed data processing system, each server embodied as a computer having a processor;

a storage system connected to the servers and configured to cooperate with the caches of the caching layer to provide a shared storage infrastructure of the distributed data processing system;

a statistics manager configured to maintain statistics comprising block placement of data blocks stored on the caches of the caching layer at the plurality of servers, cache bandwidth usage for each server from among the plurality of servers, and a cache bandwidth threshold for each server; and a cache coordinator configured to utilize the statistics to implement a replication phase of a dynamic caching technique that adaptively controls a number of copies of a data block stored on one or more of the caches of the caching layer, the cache coordinator further configured to cooperate with the processor to execute the replication phase of the dynamic caching technique to increase the number of copies of the data block stored on the one or more caches, the replication phase when executed operable to:

determine that a number of data block requests identified by the cache bandwidth usage for a source server of the plurality of servers exceeds the cache bandwidth threshold for the source server that comprises a total number of data block requests that can be processed by the source server, the number of data block requests for the source server including one or more data block requests directed to the data block;

determine that a number of data block requests identified by the cache bandwidth usage for a target server of the plurality of servers is less than or equal to the cache bandwidth threshold for the target server that comprises a total number of data block requests that can be processed by the target server;

copy the data block to the cache of the target server based on the determination; and redirect the one or more data block requests directed to the data block at the source server to the copied data block at the target server to alleviate congestion in the distributed data processing system; and wherein the cache coordinator is further configured to execute a consolidation phase of the dynamic caching technique to decrease the number of copies of the data block, the consolidation phase when executed operable to:

determine that the number of copies of the data block is greater than a minimum number of replicas in the distributed data processing system;

determine that the number of data block requests assigned to the target server is less than or equal to the total number of data block requests that can be processed by the target server, the number of data block requests assigned to the target server including one or more data block requests directed to the data block at the source server;

remove the data block from the source server; and redirect the one or more data block requests directed to the removed data block at the source server to the target server to improve storage efficiency in the distributed data processing system.

17. The distributed data processing system of claim 16 wherein the statistics manager is embodied as a tree data structure to maintain the statistics pertaining to the data block located on the storage system and one or more caches of the caching layer.

\* \* \* \* \*